United States Patent
Bartak

(10) Patent No.: US 10,545,009 B1
(45) Date of Patent: *Jan. 28, 2020

(54) ANTI-CANT INDICATOR

(71) Applicant: Tom Bartak, Bloomfield, NE (US)

(72) Inventor: Tom Bartak, Bloomfield, NE (US)

(*) Notice: Subject to any disclaimer, the term of this patent is extended or adjusted under 35 U.S.C. 154(b) by 0 days.

This patent is subject to a terminal disclaimer.

(21) Appl. No.: 16/204,462

(22) Filed: Nov. 29, 2018

Related U.S. Application Data

(63) Continuation-in-part of application No. 15/819,983, filed on Nov. 21, 2017, now Pat. No. 10,151,561.

(60) Provisional application No. 62/424,890, filed on Nov. 21, 2016.

(51) Int. Cl.
*F41G 1/44* (2006.01)
*G01C 9/24* (2006.01)
*G01C 9/34* (2006.01)

(52) U.S. Cl.
CPC ............. *F41G 1/44* (2013.01); *G01C 9/24* (2013.01); *G01C 9/34* (2013.01)

(58) Field of Classification Search
CPC . F41G 1/44; F41G 1/38; F41G 11/003; G01C 9/18; G01C 9/20; G01C 9/22; G01C 9/24; G01C 9/32; G01C 9/34; G01C 9/36
USPC ......................................................... 42/120
See application file for complete search history.

(56) References Cited

U.S. PATENT DOCUMENTS

| | | | | |
|---|---|---|---|---|
| 4,110,609 | A * | 8/1978 | Beer | G01C 9/06 250/231.1 |
| 4,647,767 | A * | 3/1987 | Jubinski | G01C 9/06 250/227.25 |
| 5,005,308 | A | 4/1991 | Parks | |
| 5,180,221 | A * | 1/1993 | Yoder | F21V 33/008 33/348.2 |
| 6,032,375 | A * | 3/2000 | Shijo | G01C 9/24 33/366.21 |
| 6,516,551 | B2 * | 2/2003 | Gaber | F41G 1/345 356/251 |
| 6,978,569 | B2 | 12/2005 | Williamson, IV et al. | |
| 8,522,446 | B1 * | 9/2013 | Staudt | G01C 9/32 33/348.2 |
| 10,151,516 | B2 * | 12/2018 | Shang | F25B 39/04 |
| 2016/0223293 | A1 | 8/2016 | Maryfield et al. | |
| 2017/0138698 | A1 | 5/2017 | York et al. | |

* cited by examiner

*Primary Examiner* — Stephen Johnson
(74) *Attorney, Agent, or Firm* — Suiter Swantz pc llo

(57) ABSTRACT

A cant indication apparatus includes a spirit level, at least one light receiving optical fiber, and at least one light transmitting and cant indicating optical fiber. The spirit level includes a first fluid with at least one of a first light transmittance or absorbance, and a second fluid with at least one of a second light transmittance or absorbance. A position of a bubble formed by the second fluid in the first fluid indicates at least an uncanted orientation and a canted orientation. The at least one light receiving optical fiber includes a light receiving end, and a spirit level connection end proximate to the spirit level. The at least one light transmitting and cant indicating optical fiber includes a spirit level connection end proximate to the spirit level, and an orientation indication end. Illumination through the orientation indication end indicates the bubble is in the uncanted orientation.

20 Claims, 23 Drawing Sheets

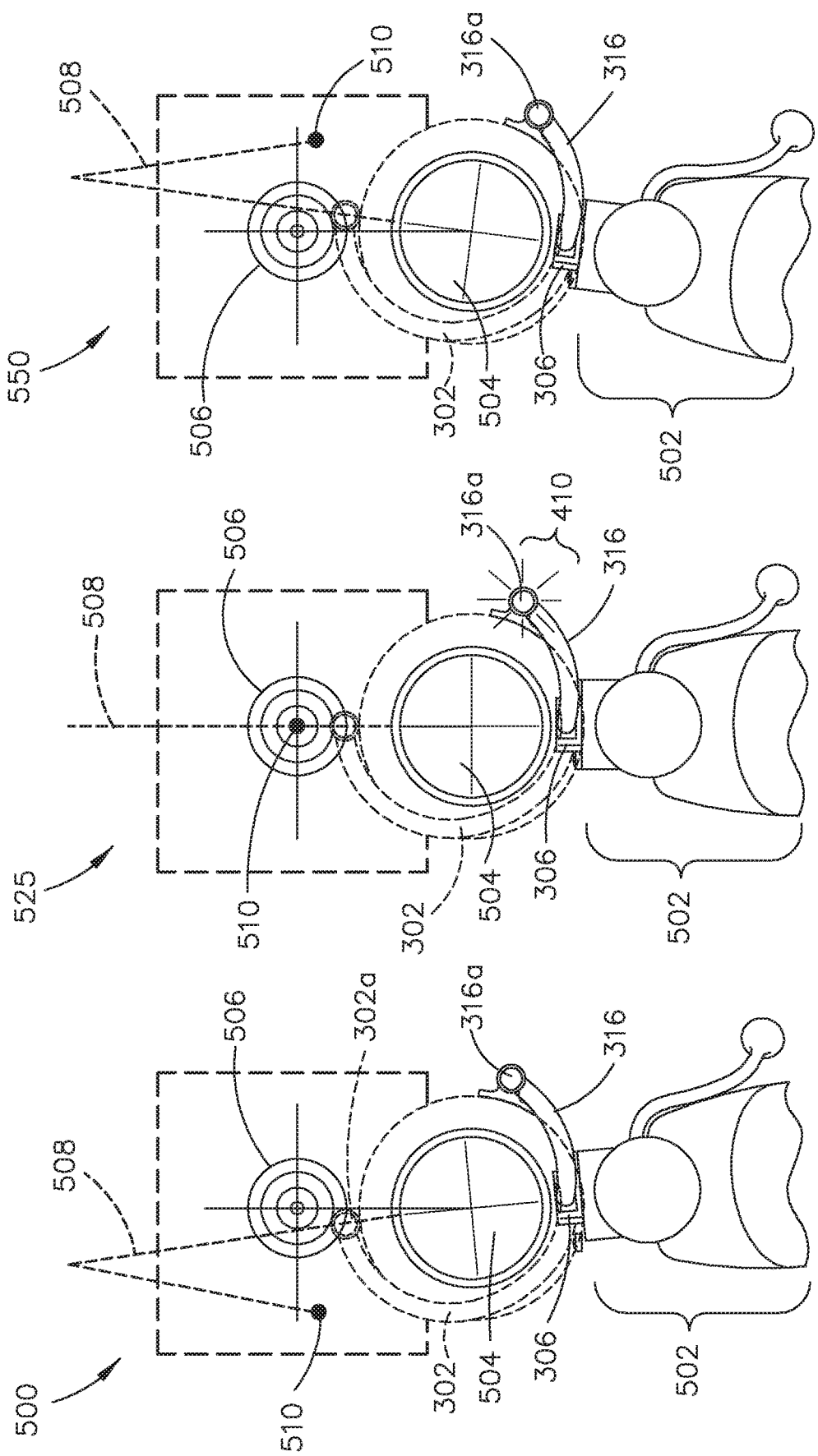

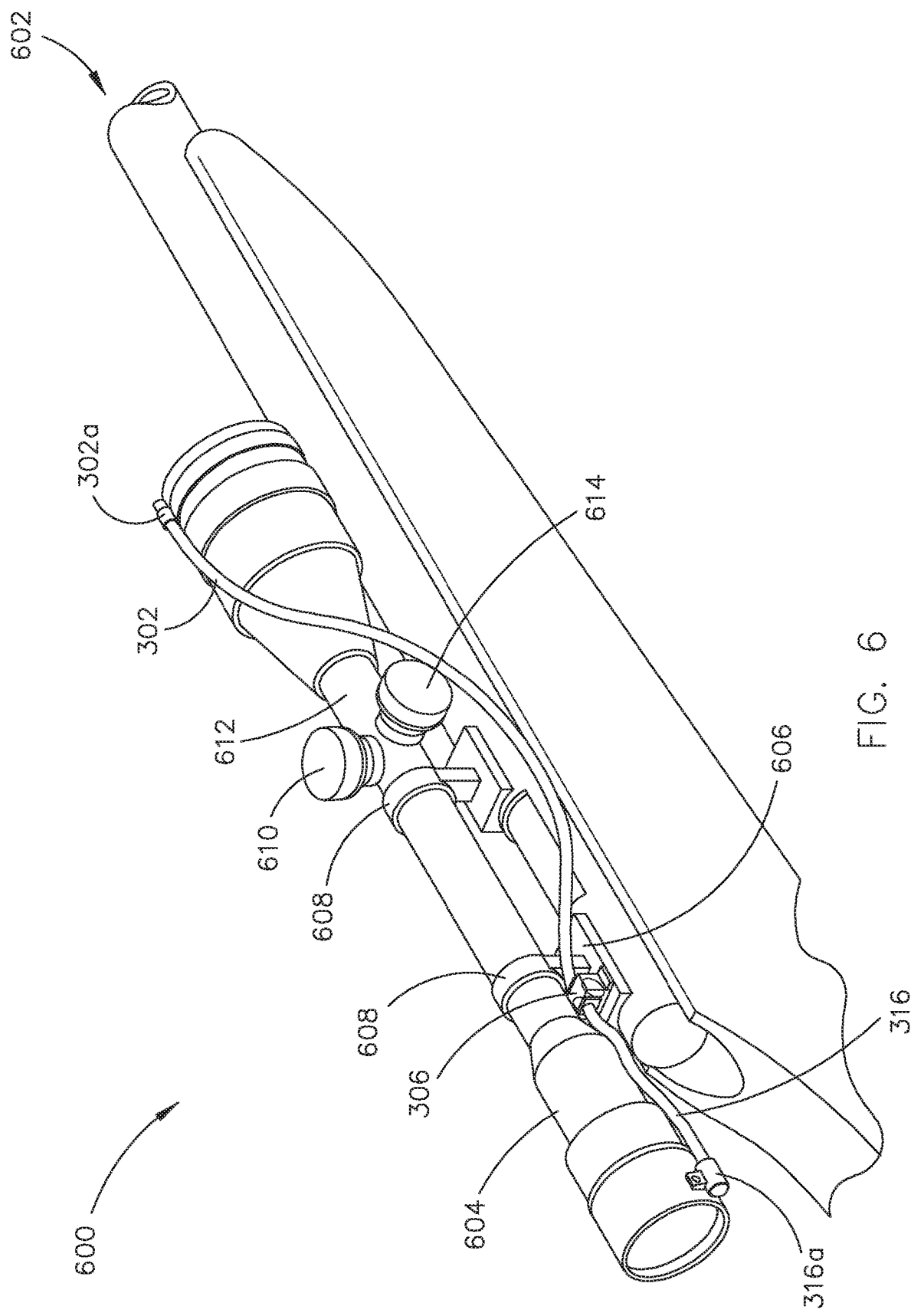

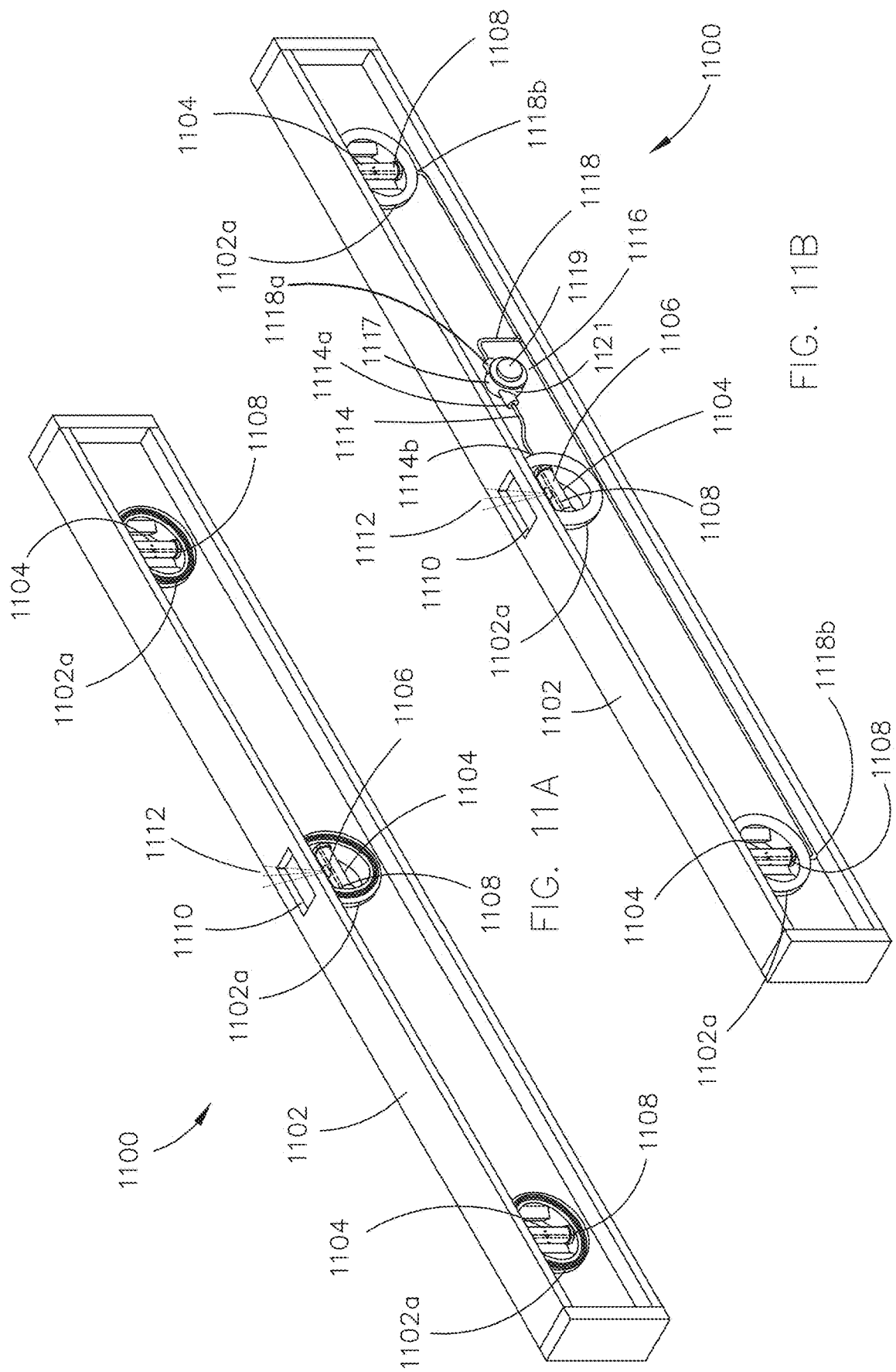

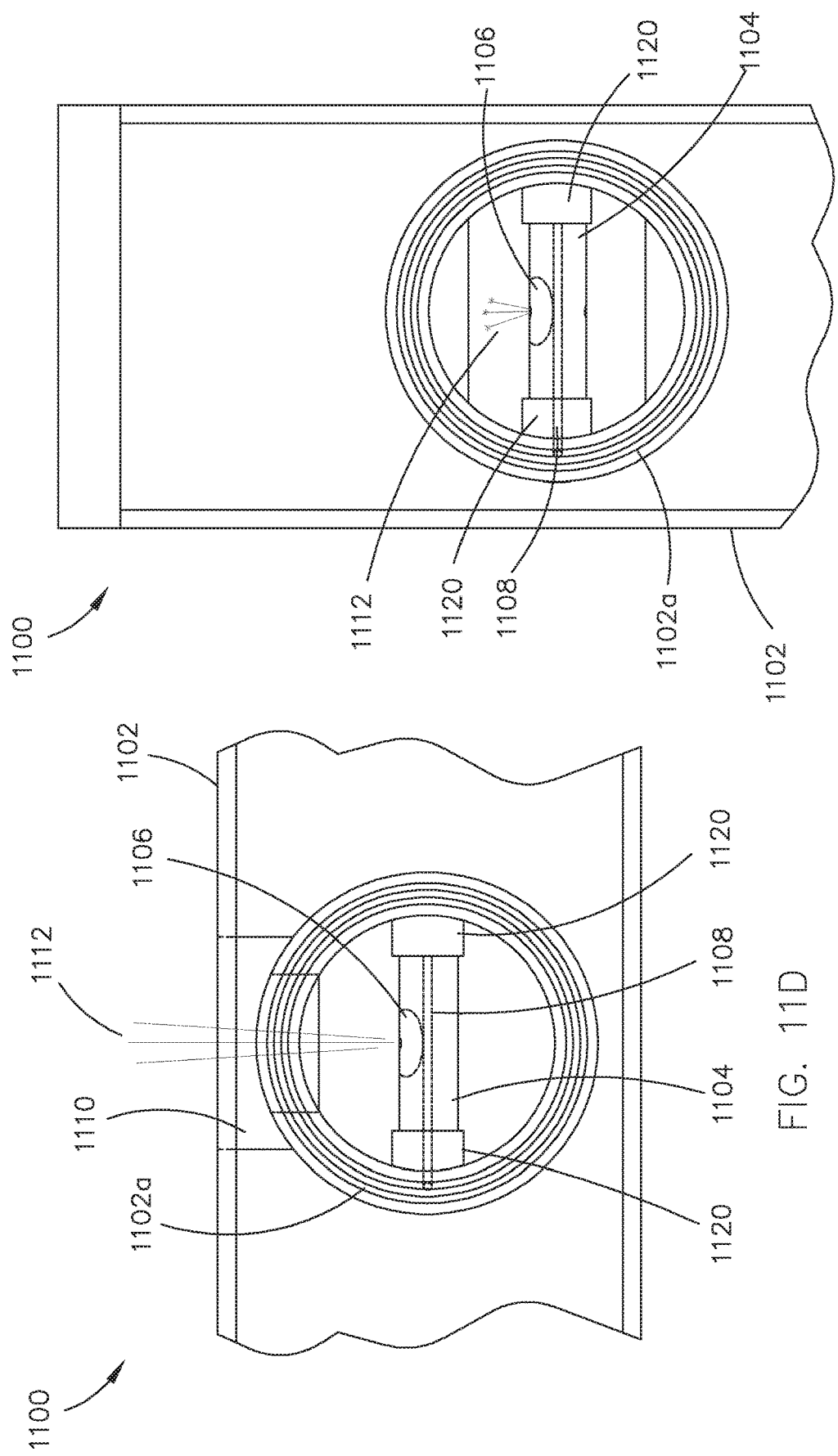

ANTI-CANT INDICATOR

CROSS-REFERENCE TO RELATED APPLICATIONS

The present application is a continuation-in-part of U.S. patent application Ser. No. 15/819,983, filed Nov. 21, 2017, titled ANTI-CANT INDICATOR, naming Tom Bartak as inventor, which will issue as U.S. Pat. No. 10,151,561 on Dec. 11, 2018; which claims the benefit under 35 U.S.C. § 119(e) of U.S. Provisional Patent Application Ser. No. 62/424,890, filed Nov. 21, 2016, titled ANTI-CANT INDICATOR, naming Tom Bartak as inventor; each incorporated herein by reference in the entirety.

TECHNICAL FIELD

The present invention generally relates to leveling devices, and in particular to an anti-cant indication apparatus including a spirit level.

BACKGROUND

A leveling device is an optical instrument used to verify points in the same horizontal plane, and can be used to measure true horizontal or relative heights. Leveling devices vary in size, shape, and use. One type of leveling device is a spirit level or bubble level, which includes an enclosed tubular or circular chamber containing an air pocket housed within a liquid (e.g., spirit vial). Leveling devices can be used to indicate and/or measure "cant", which is defined as a tilt or a slope to one slope relative to a vertical axis of the earth and/or a surface of the earth.

In a long-range shooting, many factors that might not affect a short-range shooting have a large impact on the ability to hit a target with dead-on accuracy. One factor includes "cant", or the tilting of a projectile launcher (e.g., a firearm such as a rifle, a shotgun, a pistol, or the like; an explosive launcher such as a grenade launcher, rocket-propelled grenade launcher, or the like; a bow; or the like) to one side relative to the vertical axis of the earth. Long-range shooters have long used scopes with levels to eliminate canting with projectile launchers. The level is generally mounted either on the projectile launcher (e.g., on top of the projectile launcher) or on the projectile launcher scope (e.g., on top of the scope tube, side of the scope tube). When aiming at the target with the projectile launcher scope, the long-range shooters need to make sure that the level on the projectile launcher or the projectile launcher scope is leveled by looking at the level and that the target is on the aiming point through an eyepiece of the projectile launcher scope at the same time. However, one-eyed shooters can focus on one or the other and even two-eyed shooters may have difficult time in paying the same degree of attentions to both the level and the eyepiece of the scope projectile launcher. As a result, this creates a subtle canting which results in a significant deviation from the planned impact point. In general, 6 degrees of a canting in 1,000-yard (e.g., 914 m) long-range shooting creates up to 3 feet (e.g., 91.4 cm) deviation from the target, which can result in missing the target.

In construction, a construction level (e.g., carpenter's level or contractor's level) may be placed on a surface to determine whether the surface is level (e.g., relative to horizontal) or plumb (e.g., relative to vertical). For example, a level may be set on, hung on, and/or held against a surface (e.g., shelf, seat, tabletop, countertop, furnituretop, wall, house frame member, roof frame member, metal surface, concrete surface, tiled surface, wooden surface, drywall surface, or the like) to eliminate canting relative to the vertical axis of the earth and/or the surface of the earth.

Therefore, it would be desirable to provide an apparatus that cures the deficiencies of prior approaches.

SUMMARY

The present disclosure is directed to a cant indication apparatus. In one embodiment, the apparatus includes a spirit level. In another embodiment, the spirit level includes a first fluid with at least one of a first light transmittance or absorbance. In another embodiment, the spirit level includes a second fluid with at least one of a second light transmittance or absorbance. In another embodiment, the second fluid forms a bubble in the first fluid. In another embodiment, a position of the bubble indicates at least an uncanted orientation and a canted orientation. In another embodiment, the apparatus includes at least one light receiving optical fiber. In another embodiment, the at least one light receiving optical fiber includes a light receiving end configured to receive illumination from an illumination source. In another embodiment, the at least one light receiving optical fiber includes a spirit level connection end proximate to the spirit level. In another embodiment, the bubble in the spirit level is nearest to the spirit level connection end of the at least one light receiving optical fiber when the bubble of the spirit level is in the uncanted orientation. In another embodiment, the apparatus includes at least one light transmitting and cant indicating optical fiber. In another embodiment, the at least one light transmitting and cant indicating optical fiber includes a spirit level connection end proximate to the spirit level and in substantial optical alignment with the spirit level connection end of the at least one light receiving optical fiber. In another embodiment, the bubble in the spirit level is nearest to the spirit level connection end of the at least one light transmitting and cant indicating optical fiber when the bubble of the spirit level is in the uncanted orientation. In another embodiment, the at least one light transmitting and cant indicating optical fiber includes an orientation indication end. In another embodiment, illumination through the orientation indication end indicates when the bubble of the spirit level is in the uncanted orientation.

The present disclosure is also directed to a system. In one embodiment, the system includes a cant indication apparatus. In another embodiment, the apparatus includes a spirit level. In another embodiment, the spirit level includes a first fluid with at least one of a first light transmittance or absorbance. In another embodiment, the spirit level includes a second fluid with at least one of a second light transmittance or absorbance. In another embodiment, the second fluid forms a bubble in the first fluid. In another embodiment, a position of the bubble indicates at least an uncanted orientation and a canted orientation. In another embodiment, the apparatus includes at least one light receiving optical fiber. In another embodiment, the at least one light receiving optical fiber includes a light receiving end configured to receive illumination from an illumination source. In another embodiment, the at least one light receiving optical fiber includes a spirit level connection end proximate to the spirit level. In another embodiment, the bubble in the spirit level is nearest to the spirit level connection end of the at least one light receiving optical fiber when the bubble of the spirit level is in the uncanted orientation. In another embodiment, the apparatus includes at least one light transmitting and cant indicating optical fiber. In another embodiment, the at least one light transmitting and cant indicating optical fiber includes a spirit level connection end proximate to the spirit level and in substantial optical alignment with the spirit level connection end of the at least one light receiving optical fiber. In another embodiment, the bubble in the spirit level is nearest to the spirit level connection end of the at least one light transmitting and cant indicating optical fiber when the bubble of the spirit level is in the uncanted orientation. In another embodiment, the at least one light transmitting and cant indicating optical fiber includes an orientation indication end. In another embodiment, illumination through the orientation indication end indicates when the bubble of the spirit level is in the uncanted orientation. In another embodiment, the system includes a projectile launcher coupled to the spirit level, the at least one light receiving optical fiber, and the at least one light transmitting and cant indicating optical fiber of the cant indication apparatus. In another embodiment, the at least the uncanted orientation and the canted orientation indicated by the position of the bubble in the spirit level being orientation states of the projectile launcher.

The present disclosure is also directed to a system. In one embodiment, the system includes a cant indication apparatus. In another embodiment, the apparatus includes a spirit level. In another embodiment, the spirit level includes a first fluid with at least one of a first light transmittance or absorbance. In another embodiment, the spirit level includes a second fluid with at least one of a second light transmittance or absorbance. In another embodiment, the second fluid forms a bubble in the first fluid. In another embodiment, a position of the bubble indicates at least an uncanted orientation and a canted orientation. In another embodiment, the apparatus includes at least one light receiving optical fiber. In another embodiment, the at least one light receiving optical fiber includes a light receiving end configured to receive illumination from an illumination source. In another embodiment, the at least one light receiving optical fiber includes a spirit level connection end proximate to the spirit level. In another embodiment, the bubble in the spirit level is nearest to the spirit level connection end of the at least one light receiving optical fiber when the bubble of the spirit level is in the uncanted orientation. In another embodiment, the apparatus includes at least one light transmitting and cant indicating optical fiber. In another embodiment, the at least one light transmitting and cant indicating optical fiber includes a spirit level connection end proximate to the spirit level and in substantial optical alignment with the spirit level connection end of the at least one light receiving optical fiber. In another embodiment, the bubble in the spirit level is nearest to the spirit level connection end of the at least one light transmitting and cant indicating optical fiber when the bubble of the spirit level is in the uncanted orientation. In another embodiment, the at least one light transmitting and cant indicating optical fiber includes an orientation indication end. In another embodiment, illumination through the orientation indication end indicates when the bubble of the spirit level is in the uncanted orientation. In another embodiment, the system includes a construction level coupled to the spirit level, the at least one light receiving optical fiber, and the at least one light transmitting and cant indicating optical fiber of the cant indication apparatus. In another embodiment, the at least the uncanted orientation and the canted orientation indicated by the position of the bubble in the spirit level being orientation states of the construction level.

The foregoing is a summary and thus may contain simplifications, generalizations, inclusions, and/or omissions of detail; consequently, those skilled in the art will appreciate that the summary is illustrative only and is not intended to be in any way limiting. Other aspects, features, and advantages of the systems, products and/or methods and/or other subject matter described herein will become apparent in the teachings set forth herein. The accompanying drawings, which are incorporated in and constitute a part of the specification, illustrate embodiments of the disclosure and together with the general description, serve to explain the principles of the invention.

BRIEF DESCRIPTION OF THE DRAWINGS

The numerous advantages of the disclosure may be better understood by those skilled in the art by reference to the accompanying figures in which:

FIG. 5A illustrates a rifle shooter's view of the anti-cant indication apparatus with a canting error, in accordance with one or more embodiments of the present disclosure;

FIG. 5B illustrates a rifle shooter's view of the anti-cant indication apparatus without a canting error, in accordance with one or more embodiments of the present disclosure;

FIG. 5C illustrates a rifle shooter's view of the anti-cant indication apparatus with a canting error, in accordance with one or more embodiments of the present disclosure;

FIG. 6 illustrates a mounting configuration of the anti-cant indication apparatus to a rifle, in accordance with one or more embodiments of the present disclosure;

FIG. 11A illustrates a construction level incorporated with the anti-cant indication apparatus, in accordance with one or more embodiments of the present disclosure;

FIG. 11B illustrates the construction level incorporated with the anti-cant indication apparatus, in accordance with one or more embodiments of the present disclosure;

FIG. 11D illustrates a partial elevation view of the construction level incorporated with the anti-cant indication apparatus, in accordance with one or more embodiments of the present disclosure;

FIG. 11E illustrates a partial elevation view of the construction level incorporated with the anti-cant indication apparatus, in accordance with one or more embodiments of the present disclosure;

DETAILED DESCRIPTION OF THE INVENTION

Reference will now be made in detail to the subject matter disclosed, which is illustrated in the accompanying drawings.

FIGS. 1A-16B generally illustrate an anti-cant indicator, in accordance with one or more embodiments of the present disclosure.

Referring generally to FIGS. 3-16B, embodiments of the present disclosure are generally directed to an anti-cant indication apparatus. Embodiments of the present disclosure are directed to sending an indication to a user when the anti-cant indication apparatus is leveled. This is accomplished by a spirit level vial filled up with a first fluid so that when the spirit level vial is leveled the bubble lines up with the light source, which allows the light to pass through the spirit level vial and to be transferred to the user's eye. The vial of the present invention may be filled with any two fluids of disparate densities and light transmittance and/or absorbance (Beer-Lamber-Bouguer law) such that significant light (photons) will either pass or not pass when the spirit level is uncanted (level) or canted (unlevel).

As used throughout the present disclosure, the terms "cant", "canting", or "canted" are generally defined by angular deviation from a vertical axis of the earth and/or horizontal plane or surface of the earth. For purposes of the present disclosure, the term "canting error" is in part used to indicate an error associated with canting of a projectile launcher (e.g., a firearm, an explosive launcher, a bow or the like) or a constructed surface. For example, in the hunting field, "cant", "canting", or "canted" is used to indicate a tilting of the projectile launcher to one side relative to the vertical axis of the earth. By way of another example, in the construction field "cant", "canting", or "canted" is in part used to indicate a tilting of the constructed surface (e.g., horizontal surface, vertical surface, angled surface, or the like) to one side relative to the vertical axis of the earth and/or the surface of the earth.

Figure 1A:
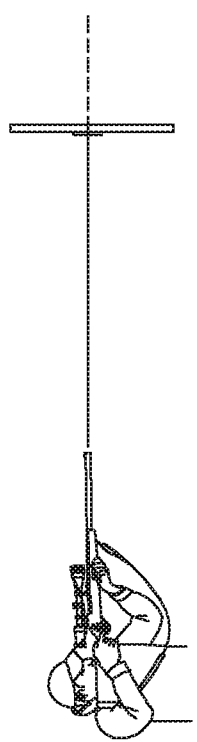
FIG. 1A illustrates a side elevation view of a bullet trajectory of a short-range shooting.
Figure 1B:
FIG. 1B illustrates a side elevation view of a bullet trajectory of a long-range shooting.
Figure 2B:
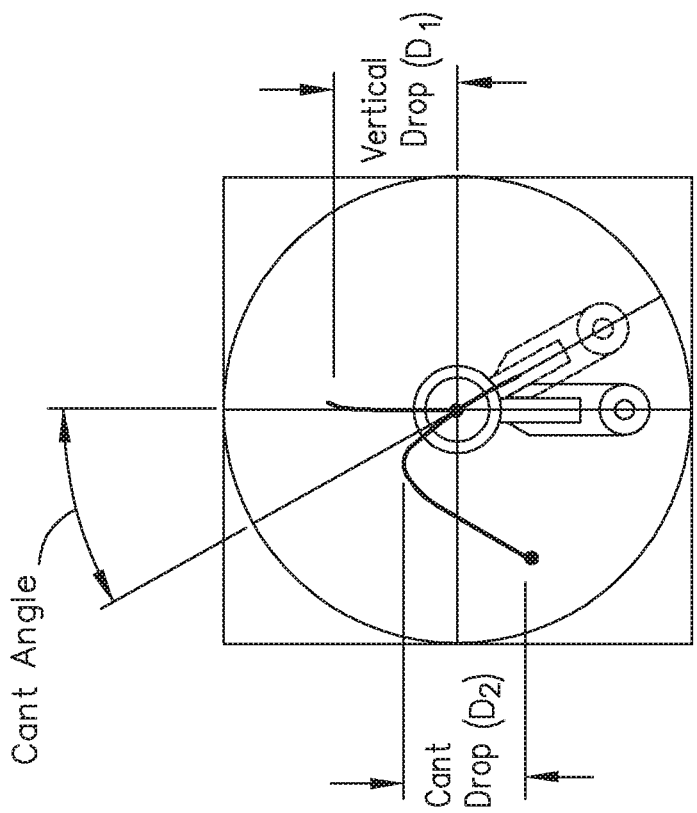
FIG. 2B illustrates an end elevation view of the bullet trajectory with cant and uncant holds for a long-range shooting corresponding to FIG. 1B.
Figure 2A:
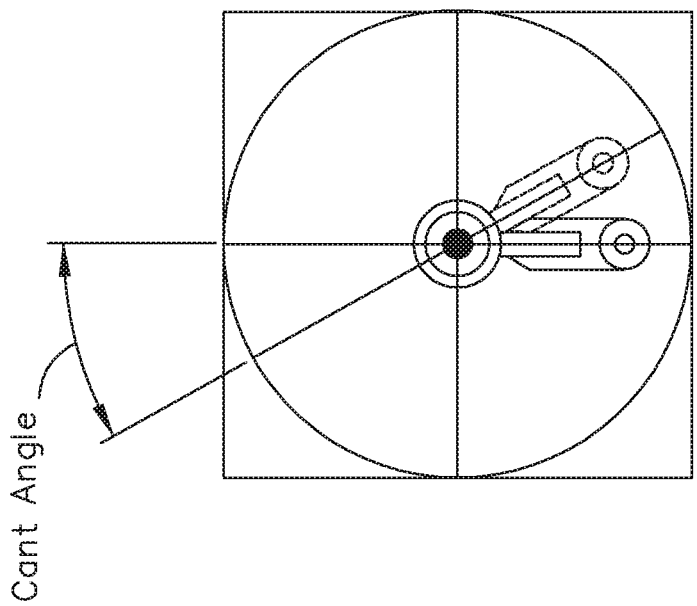
FIG. 2A illustrates an end elevation view of the bullet trajectory with cant and uncant holds for a short-range shooting corresponding to FIG. 1A.

FIGS. 1A and 1B illustrate side views of a bullet trajectory of a short-range shooting and a long-range shooting, respectively. FIGS. 2A and 2B illustrate a comparison of bullet with cant hold and uncant hold trajectories for a short-range shooting and a long-range shooting, respectively.

FIG. 1A illustrates a side view of a bullet trajectory of a short-range shooting. In a shot-range shooting, a distance that a bullet travels from a rifle to a center of a target is short so as that the bullet experiences practically negligible gravity force. In this regard, the bullet travels straight from the rifle to the center of the target and an elevation of the bullet fired at the rifle is the same as an elevation of the center of the target hit by the bullet. In other words, the bullet experiences no vertical drop in this case.

FIG. 2A illustrates an end view of the bullet trajectory with cant and uncant holds for a short-range shooting corresponding to FIG. 1A. Since the bullet travels straight from the rifle to the center of the target as shown in FIG. 1A (e.g., no vertical drop), the bullet hits the center of the target even with the cant hold. In this case, holding the rifle uncanted has negligible impact on where the bullet lands. In other words, for both cases (e.g., cant or uncant holds) the bullet ends up landing on the center of the target. In this regard, for the short-range shooting, canting errors have no impact on a shooting accuracy.

FIG. 1B illustrates a side view of a bullet trajectory of a long-range shooting. In a long-range shooting, a distance that a bullet travels from a rifle to a center of a target is long so as that the bullet experiences gravity force, which results in the bullet trajectory to have an arc as shown in FIG. 1B. In this regard, the bullet travels via an arced bullet trajectory (e.g., a bullet projectile) from the rifle to the center of the target and an elevation of the bullet fired at the rifle is different from an elevation of the center of the target hit by the bullet. The vertical drop is defined as a vertical distance between an apex of trajectory and a bullet impact point. In the long-range shooting, a shooter needs to account for the vertical drop D1 of the bullet and its effect in order to hit the center of the target accurately. A cant angle has a large impact on a bullet projectile, which, in turn, affects a bullet impact point considerably.

FIG. 2B illustrates an end view of the bullet trajectory with cant and uncant holds for a long-range shooting corresponding to FIG. 1B. Since the bullet travels via an arced bullet trajectory from the rifle to the center of the target, the bullet lands on different places depending on canting angles. When the rifle is held uncanted (e.g., vertical hold), the bullet travels via the vertical trajectory, passes the apex of the vertical trajectory, and lands on the center of the target. The bullet experiences the vertical drop D1 as shown in FIG. 2B. When the rifle is held canted (e.g., cant hold), the bullet travels via a different bullet trajectory, passes an apex of cant trajectory, and lands on an impact point of the cant hold as shown in FIG. 2B. The bullet experiences the vertical drop D2. It is noted that, while the bullet impact points for the uncant hold and cant hold are different, the vertical drops D1 and D2 of the bullet trajectories with the uncant hold and cant hold, respectively, are the same due to the gravity force applied onto the bullets. The gravity force pulls the bullet straight down vertically to the ground. The gravity force and the cant angle cause the bullet to diverge from the vertical trajectory, thereby missing the target. This becomes more significant at more distant targets.

Although the descriptions provided in FIGS. 1A-2B illustrate a rifle, it is noted herein that the descriptions provided in FIGS. 1A-2B may be extended to any projectile launcher known in the art including, but not limited to, a firearm, an explosive launcher, a bow, or the like.

FIGS. 3-10 illustrate an anti-cant indication apparatus 300, in accordance with one or more embodiments of the present disclosure.

Figure 3:
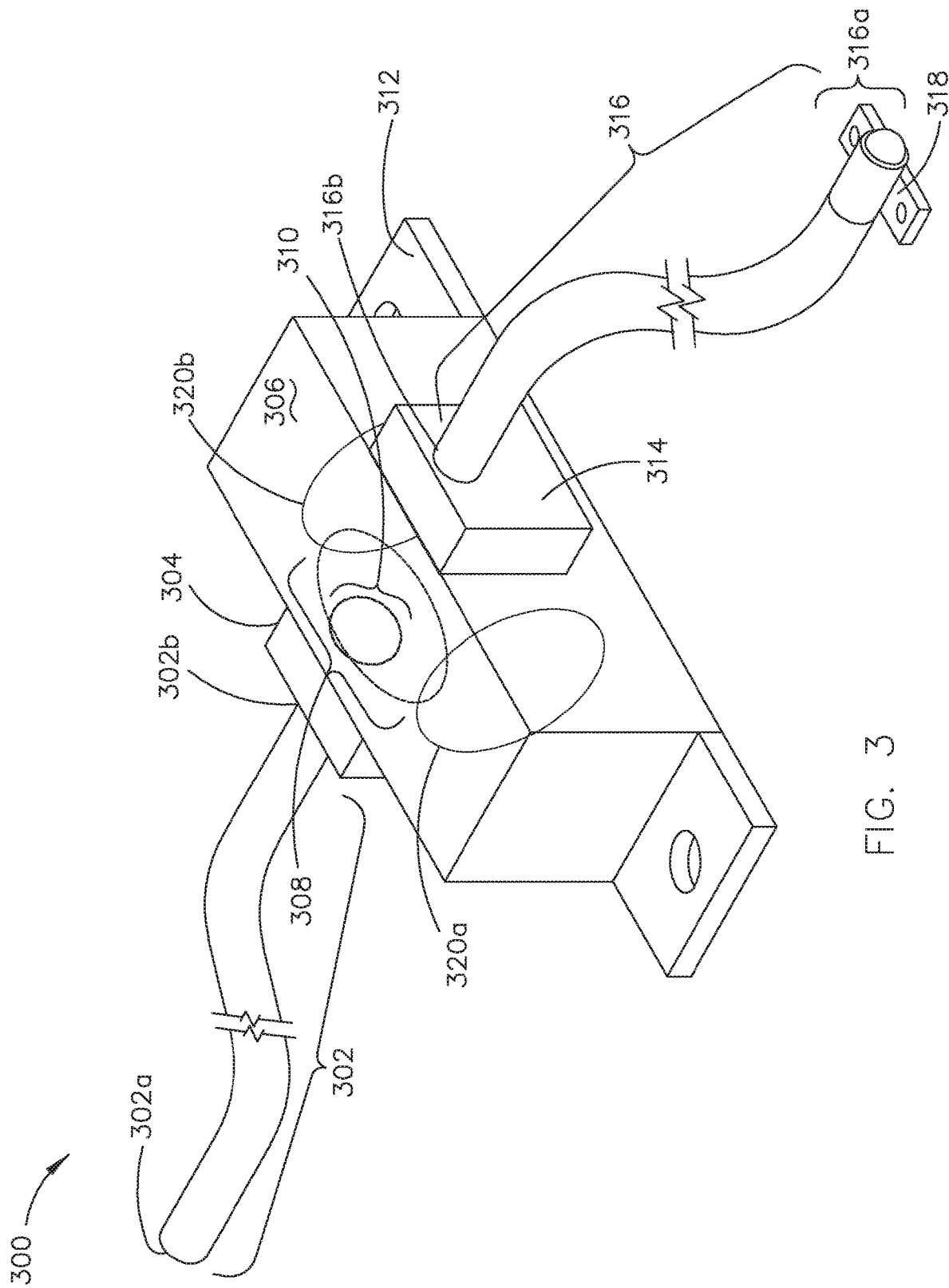
FIG. 3 illustrates an anti-cant indication apparatus, in accordance with one or more embodiments of the present disclosure.

Referring now to FIG. 3, in one embodiment, an anti-cant indication apparatus 300 (e.g., anti-cant indicator apparatus 300, anti-cant indicator 300, cant indication apparatus 300, cant indicator apparatus 300, cant indicator 300, or the like) may include a light collecting end 302a of a first fiber 302 for collecting light. For example, the light collected by the light collecting end 302a of the first fiber 302 may be natural light. By way of another example, the natural light may be sunlight. For instance, the natural light may be moonlight. It is noted that the natural light may include any natural light known in the art capable of providing a light source.

In some embodiments, the light collected by the light collecting end 302a of the first fiber 302 may be artificial light. For example, the artificial light may be a light from electroluminescence including, but not limited to, a light-emitting-diode (LED). By way of another example, the artificial light may be caused by an electric discharge including, but not limited to, a lamp. It is noted that any artificial light which does not damage human eyes may be utilized in the present disclosure as the light source, such as, but not limited to, photoluminescence lights, electrochemiluminescence lights, chemiluminescence lights, bioluminescence lights, or the like.

In some embodiments, the anti-cant indication apparatus 300 may be equipped with objective lenses (not shown) to focus the light on the collecting end 302a of the first fiber 302. It is noted that any objective lens known in the art gathering and focusing the light may be utilized in the present disclosure to provide the light source to the light collecting end 302a of the first fiber 302.

In one embodiment, the anti-cant indication apparatus 300 may include a first fiber 302 configured to transmit light collected by the light collecting end 302a of the first fiber 302 to a first connecting end 302b of the first fiber 302. For example, the first fiber 302 may be an optical fiber (if unshielded, or a fiber optic cable if shielded and/or contained within a protective jacket). By way of another example, the optical fiber may be a bundle of optical fibers so as to collect and transmit the light from the light source effectively between the light collecting end 302a of the first fiber 302 and the first connecting end 302b of the first fiber 302. For instance, the connecting end 302b of the first fiber 302 may be connected to a spirit level vial 306 (e.g., spirit level 306, or the like) via a first connector 304, which is described herein thereafter.

In some embodiments, the first fiber 302 may be formed from any optical fiber material known in the art including, but not limited to, silica, fluoride glass, phosphate glass, or chalcogenide glass. For example, the optical fiber may range from 0.003 inches to 0.25 inches in diameter. For instance, the optical fiber may be of any diameter utilized with firearm scopes or bow scopes known in the art including, but not limited to, 0.007, 0.010, 0.014, 0.015, 0.017, 0.019, 0.021, 0.024, 0.029, 0.030, 0.040, 0.060, 0.078, 0.100, or 0.118 inches in diameter. In some embodiments, the first fiber 302 may be a flexible optical fiber. For example, the first fiber 302 may need to be bent in order to accommodate various shapes and/or sizes of a projectile launcher (e.g., firearm, explosive launcher, bow, or the like) scope.

In some embodiments, a length of the first fiber 302 may be selected so as to fit various projectile launcher scope models. For example, the first fiber 302 may be mounted on top of a projectile launcher scope to receive the light effectively and the length of the first fiber 302 may need to be long enough to reach the top of the projectile launcher scope. This varies from projectile launcher scope to projectile launcher scope. In this regard, the first fiber 302 of the anti-cant indication apparatus 300 is customizable to meet various shapes and/or sizes of a projectile launcher scope as well as various locations for the anti-cant indication apparatus 300 to be installed on the projectile launcher scope or the projectile launcher.

In one embodiment, the anti-cant indication apparatus 300 may include a second fiber 316 configured to transmit a light collected at the light collecting end 302a of the first fiber 302 via an air pocket 308 of a spirit level vial 306. For example, the second fiber 316 may be an optical fiber. By way of another example, the optical fiber may be a bundle of optical fibers so as to collect and transmit the light from the air pocket 308 of the spirit level vial 306 effectively between a second connecting end 316b of the second fiber 316 and an indicator end 316a of the second fiber 316. For instance, the second connecting end 316b of the second fiber 316 may be aligned with the air pocket 308 of the spirit level vial 306. In another instance, the indicator end 316a of the second fiber 316 may be connected to an eyepiece of the projectile launcher scope.

In some embodiments, the second fiber 316 may be formed from any optical fiber material known in the art including, but not limited to, silica, fluoride glass, phosphate glass, or chalcogenide glass. In some embodiments, the second fiber 316 may be a flexible optical fiber. For example, the second fiber 316 may need to be bent in order to accommodate various shapes and/or sizes of a projectile launcher scope.

In some embodiments, a length of the second fiber 316 may be selected so as to fit various projectile launcher scope models. For example, the second fiber 316 may be mounted on eyepiece of a projectile launcher scope so that the light is effectively sent to the shooter's eyes and the length of the second fiber 316 may need to be long enough to reach the eyepiece of the projectile launcher scope. This varies from a projectile launcher scope to a projectile launcher scope. In this regard, the second fiber 316 of the anti-cant indication apparatus 300 is customizable to meet various shapes and/or sizes of a projectile launcher scope as well as various locations for the anti-cant indication apparatus 300 to be installed on the projectile launcher scope or the projectile launcher.

In some embodiments, the indicator end 316a of the second fiber 316 may be equipped with an attachment 318 configured to be mounted on the eyepiece of the projectile launcher scope. For example, the attachment 318 may include any attachment method known in the art suitable for mounting on a projectile launcher scope including, but not limited to, a magnet, a clip, a screw, a bolt, a clamp, a VELCRO, a tie, or an adhesive (e.g., a glue, or the like).

In one embodiment, the anti-cant indication apparatus 300 may include a spirit level vial 306 for indicating an orientation of the anti-cant indication apparatus 300 relative to the vertical axis of the earth. For example, any off-centered orientation relative to the vertical axis of the earth may be indicated by an air pocket 308 of the spirit level vial 306 not being at the center of the spirit level vial 306. In some embodiments, the spirit level vial 306 may be any spirit level vial in the art designed to indicate whether a projectile launcher is leveled horizontally. For example, the spirit level vial 306 may include, but is not limited to, a tubular type spirit level vial or bubble level vial (e.g., from a construction level including, but not limited to, a carpenter's level or a contractor's level), or the like.

In some embodiments, the spirit level vial 306 of the anti-cant indication apparatus 300 may be filled with, for example, a dark-colored fluid (e.g., opaque fluid) 307. For example, the dark-colored fluid 307 of the spirit level vial 306 may be a colored spirit or alcohol. By way of another example, the colored spirit or alcohol may be a combination of a spirit or alcohol with a dye. For instance, a type and the amount of the dye may be selected so that the fluid 307 of the spirit level vial 306 is dark enough to block a light from one side to the other side. Such a dye may include, but is not limited to, a leather dye.

It is noted herein that a spirit level vial 306 may be partially filled with the dark-colored fluid 307 (e.g., including an air pocket 308) having a transmittance and/or absorbance that does inhibit light and may be fabricated from a clear or light-colored (e.g., transparent or translucent, or non-opaque) material or a dark-colored (e.g., opaque) material having a transmittance and/or absorbance that does not inhibit light. In addition, it is noted herein that a spirit level vial 306 may be partially filled with a clear or light-colored (e.g., transparent or translucent, or non-opaque) fluid having a transmittance and/or absorbance that does inhibit light and may be fabricated from a dark-colored (e.g., opaque) material or a clear or light-colored (e.g., transparent or translucent, or non-opaque) material having a transmittance and/or absorbance that does not inhibit light. Further, it is noted herein that the dark-colored (e.g., opaque) material may be a coating or covering instead of a property of a material from which the spirit level vial 306 may be fabricated.

In some embodiments, the dark-colored fluid 307 of the spirit level vial 306 may have a selected air pocket 308 size. For example, the dark-colored fluid 307 of the spirit level vial 306 preferably has an air pocket (bubble) 308 with a diameter of between fifty percent (50%) to one-hundred fifty percent (150%) of the diameter of the optical fiber 302, 316. For instance, the circumference of the bubble 308 is correspondingly and generally sized such that it is to configured to encompass the circumference of the optical fiber 302, 316 when the anti-cant indication apparatus 300 is uncanted (e.g., as illustrated in FIGS. 12A-12D). In addition, the circumference of the bubble 308 is correspondingly and generally sized such that it is configured to encompass the circumference of multiple (e.g., 2, 3, up to an N number) of the optical fibers 302, 316, where the multiple optical fibers 302, 316 are either touching or spaced a selected distance apart, when the anti-cant indication apparatus 300 is uncanted (e.g., as illustrated in FIGS. 13A-13C and 14A-14C).

By way of another example, the air pocket 308 size may be selected so as to satisfy the anti-cant requirements from the shooter. For instance, a smaller air pocket size of the spirit level vial 306 may be suitable for the shooter with high precision requirements. In addition, a larger air pocket size of the spirit level vial 306 may be suitable for the shooter with relatively low precision requirements. The degree of the canting error may be controlled by the air pocket size of the spirit level vial 306. In general, the smaller the air pocket size of the spirit level vial 306 the more accurate the indication will be.

Generally, the air pocket 308 is of a different (or disparate) density than the fluid within the spirit level vial 306, such that the air pocket 308 and the fluid do not mix. In addition, the air pocket 308 is of a different (or disparate) light transmittance and/or absorbance than the fluid within the spirit level vial 306, such that significant light (photons) will either pass or not pass when the spirit level is uncanted (level) or canted (unlevel).

It is noted herein that the air pocket 308 and the dark-colored fluid 307 within the spirit level vial 306 are not to be considered as limiting for purposes of the present disclosure. For example, FIGS. 3-16B illustrates that the spirit level vial 306 (or a spirit level 1104) may include any first fluid 307, 1105 (e.g., gas or liquid) and any second fluid 308, 1106 (e.g., gas or liquid), where the first fluid 307, 1105 and the second fluid 308, 1106 are of different (or disparate) densities and different light transmittance and/or absorbance, such that significant light (photons) will either pass or not pass when the spirit level is uncanted (level) or canted (unlevel). For instance, the spirit level vial 306, 1104 may be filled with a first fluid 307, 1105 that is dark-colored (e.g., opaque) and configured to not allow light to pass through (e.g., when the spirit level vial 306, 1104 is canted) and a second fluid 308, 1106 of a different (or disparate) density that is clear or light-colored (e.g., transparent or translucent, or non-opaque) and configured to allow light to pass through (e.g., when the spirit level vial 306, 1104 is uncanted). In addition, the spirit level vial 306, 1104 may be dark-colored, and be filled with a first fluid 307, 1105 that is clear or light-colored (e.g., transparent or translucent, or non-opaque) and configured to not allow light to pass through (e.g., when the spirit level vial 306, 1104 is canted) and a second fluid 308, 1106 of a different (or disparate) density that is clear or light-colored (e.g., transparent or translucent, or non-opaque) and configured to allow light to pass through (e.g., when the spirit level vial 306, 1104 is uncanted). Generally, one fluid within the spirit level vial 306 may be of a darker color than another fluid within the spirit level vial 306.

In some embodiments, the spirit level vial 306 of the anti-cant indication apparatus 300 may be connected to both the first connecting end 302b of the first fiber 302 and the second collecting end 316b of the second fiber 316. For example, a surface of the spirit level vial 306 may be connected to the first connecting end 302b of the first fiber 302 and an opposite surface of the spirit level vial 306 may be connected to the second collecting end 316b of the second fiber 316. By way of another example, the location of the first connecting end 302b of the first fiber 302 may be selected so that an attachment surface 310 of the first connecting end 302b of the first fiber 302 may be aligned mostly within the air pocket 308 of the spirit level vial 306 when the spirit level vial 306 is leveled. By way of yet another example, the location of the second connecting end 316b of the second fiber 316 may be selected so that an attachment surface (not shown due to the drawing angle) of the second connecting end 316b of the second fiber 316 may be aligned mostly within the air pocket 308 of the spirit level vial 306 when the spirit level vial 306 is leveled. In this regard, when the spirit level vial 306 is leveled, the air pocket 308 may line up with the first connecting end 302b of the first fiber 302 on one end and the second connecting end 316b of the second fiber 316 on the other end so that the light collected at the light collecting end 302a of the first fiber 302 may be transmitted through and reached all the way down to the indicator end 316a of the second fiber 316 via the air pocket 308 of the spirit level vial 306.

In general, a spirit level vial 306 is constructed such that it has a barrel-shaped tube with a slightly larger diameter in its middle so as that the air pocket 308 naturally rests in the center when it is leveled. Due to this construction feature of the spirit level vial 306, the air pocket 308 occupies a space in a top center portion of the spirit level vial 306 when it is leveled. In this regard, the first connecting end 302b of the first fiber 302 and the second connecting end 316b of the second fiber 316 may be connected to the top center portion of the spirit level vial 306 as shown in FIG. 3. It is noted that, while the first connecting end 302b of the first fiber 302 and the second connecting end 316b of the second fiber 316 shown in FIG. 3 are connected to the top center portion of the spirit level vial 306, such a configuration is merely provided for illustrative purposes.

It is contemplated that, while the spirit level vial 306 depicted in FIG. 3 is presently preferably a cuboid-shaped level vial, such a configuration is merely provided for illustrative purposes. The present disclosure may be configured to utilize other level vial shapes such as a cylinder-shaped level vial, a bulls-eye level vial, or the like.

In one embodiment, the anti-cant indication apparatus 300 may include markings 320a and 320b for the spirit level vial 306 to indicate how leveled the spirit level vial 306 is. For example, the air pocket 308 located within the markings 320a and 320b indicates that the spirit level vial 306 of the anti-cant indication apparatus 300 is properly leveled. On the other hand, the air pocket 308 located slightly off to one side of the marking 320a or 320b indicates that the spirit level vial 306 of the anti-cant indication apparatus 300 needs an adjustment in order to be properly leveled. It is noted that embodiments of the present disclosure may be equipped with other marking configurations including, but not limited to, a finer marking configuration or a gauge marking configuration for more accurate level indication.

In one embodiment, the anti-cant indication apparatus 300 may include a spirit level vial anchor 312 for mounting the spirit level vial 306 onto a projectile launcher or a projectile launcher scope securely. The spirit level vial anchor 312 may include any anchoring mechanism known in the art for securely mounting an object onto a flat surface. For example, the spirit level vial anchor 312 may be equipped with magnetic plates for attaching the spirit level vial anchor 312 to a metal portion of the projectile launcher or the projectile launcher scope. By way of another example, the spirit level vial anchor 312 may be equipped with metal plate brackets so as to attach the spirit level vial anchor 312 to the projectile launcher or the projectile launcher scope with screws, bolts, or the like.

In one embodiment, the anti-cant indication apparatus 300 may include a first connector 304 and a second connector 314 for mounting the first fiber 302 and the second fiber 316 to the spirit level vial 306, respectively. For example, the first connector 304 may be configured to attach the first connecting end 302b of the first fiber 302 to a first surface of the spirit level vial 306 where air pocket 308 of the spirit level vial 306 would be rested when the spirit level vial 306 of the anti-cant indication apparatus 300 is leveled. By way of another example, the second connector 314 may be configured to attach the second connecting end 316b of the second fiber 316 to a second surface of the spirit level vial 306 where air pocket 308 of the spirit level vial 306 would be rested when the spirit level vial 306 of the anti-cant indication apparatus 300 is leveled. It is noted that the first surface that the first connecting end 302b of the first fiber 302 is attached to and the second surface that the second connecting end 316b of the second fiber 316 is attached to are located on opposite sides of the center of the spirit level vial 306.

It is noted herein that the anti-cant indication apparatus 300 may include multiple spirit level vials 306 set at a select angle relative to one another, where the multiple spirit level vials 306 are aligned with the one or more fibers 302. For example, the anti-cant indication apparatus 300 may include a first fiber 302 proximate to a first spirit level vial 306, a second fiber 302 opposite the first fiber 302, proximate to the first spirit level vial 306, and proximate to a second spirit level vial 306, and a fiber 316, such that a user will only see light from the fiber 316 when the air pockets 308 of both the first spirit level vial 306 and the second spirit level vial 306 are aligned with the first fiber 302, the second fiber 302, and the fiber 316. By way of another example, the first spirit level vial 306 may be mounted perpendicular to the axis of the barrel in a first direction (e.g., in an x-direction, where the barrel is in a y-direction) and the second spirit level vial 306 may be mounted perpendicular to the axis of the barrel in a second direction (e.g., in a z-direction, where the barrel is in the y-direction), such that the first spirit level vial 306 and the second spirit level vial 306 are perpendicular to each other. More generally, the multiple spirit level vials 306 may be set at any select angle relative to one another.

FIGS. 4A-4C and FIGS. 12A-14C illustrate top plan views and side elevation views of the anti-cant indication apparatus 300 with and without a canting error, respectively, in accordance with one or more embodiments of the present disclosure. It is noted herein that the embodiments and components described previously herein with respect to the apparatus 300 should be interpreted to extend to the embodiments described in FIGS. 4A-4C and FIGS. 12A-14C.

Figure 4C:
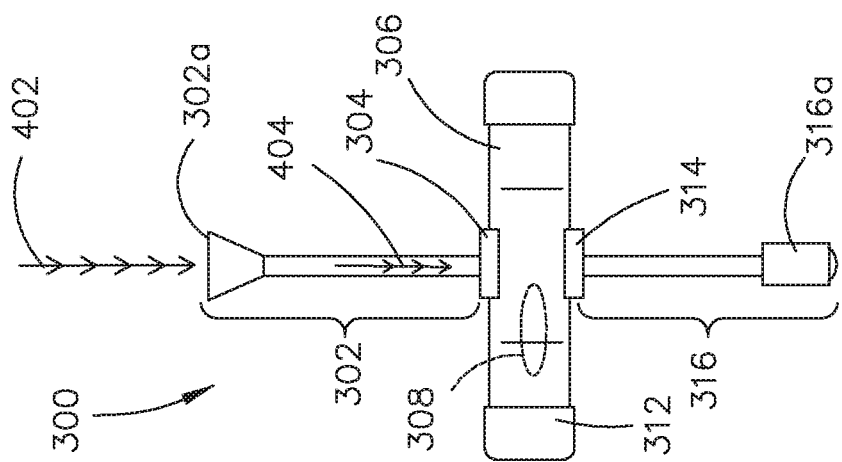
FIG. 4C illustrates a top plan view of the anti-cant indication apparatus with a canting error, in accordance with one or more embodiments of the present disclosure.
Figure 4B:
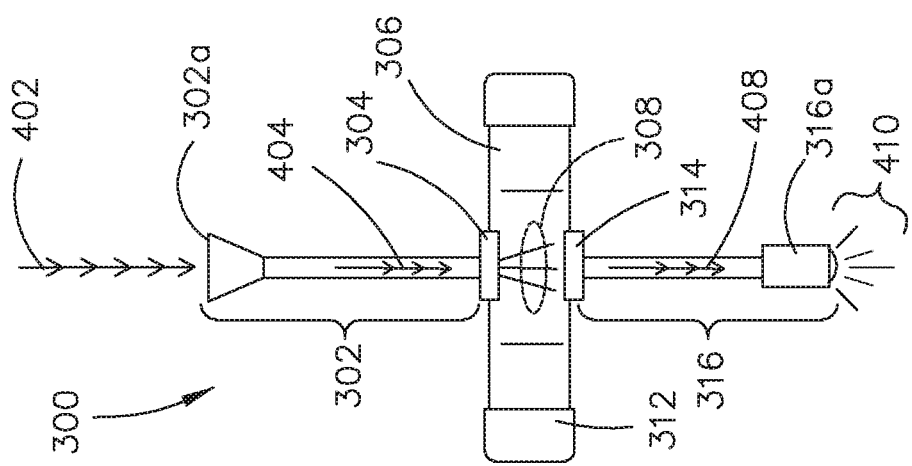
FIG. 4B illustrates a top plan view of the anti-cant indication apparatus without a canting error, in accordance with one or more embodiments of the present disclosure.
Figure 4A:
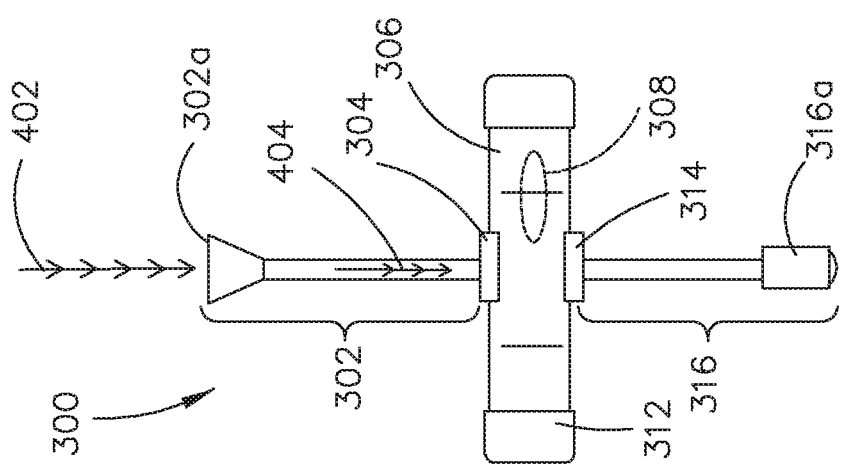
FIG. 4A illustrates a top plan view of the anti-cant indication apparatus with a canting error, in accordance with one or more embodiments of the present disclosure.

FIGS. 4A-4C generally illustrate the top plan view of the anti-cant indication apparatus 300 with and without a canting error.

FIG. 4A is an illustration depicting a top plan view of the anti-cant indication apparatus 300 with a canting by tilting the projectile launcher to the left relative to the vertical axis of the earth. In one embodiment, the anti-cant indication apparatus 300 may not be leveled. For example, the anti-cant indication apparatus 300 may be canted. By way of another example, the canting may be indicated by the light 404 from the light source 402 not passing through the spirit level vial 306 of the anti-cant indication apparatus 300. For instance, the air pocket 308 of the spirit level vial 306 may not be located at the center of the spirit level vial 306. In FIG. 4A, the air pocket 308 of the spirit level vial 306 is depicted to rest in the right portion of the spirit level vial 306. In this regard, the air pocket 308 of the spirit level vial 306 is not lined up with the light 404 from the light source 402 via the first fiber 302 and the light 404 from the light source 402 is blocked by the dark-colored fluid 307 of the spirit level vial 306. The shooter looking from the eyepiece of the projectile launcher scope equipped with the indicator end 316a of the second fiber 316 does not get the indication that the spirit level vial 306 of the anti-cant indication apparatus 300 is leveled. It is noted herein that the terms "light" and "illumination" may be considered synonymous, for purposes of the present disclosure.

FIG. 4B is an illustration depicting a top plan view of the anti-cant indication apparatus 300 without a canting. In one embodiment, the anti-cant indication apparatus 300 may be leveled. For example, the anti-cant indication apparatus 300 may include the air pocket 308 of the spirit level vial 306 rested at the center of the spirit level vial 306. By way of another example, the air pocket 308 of the spirit level vial 306 may be transparent. For instance, the air pocket 308 of the spirit level vial 306 may transmit the light 404 from the light source 402 as a transmitted light 408 within the second fiber 316. In another instance, the transmitted light 408 may exit from the indicator end 316a of the second fiber 316 and emit a light 410.

It is noted that the light 404 from the light source 402 may pass through the air pocket 308 and reach the indicator end 316a of the second fiber 316 when the spirit level vial 306 of the anti-cant indication apparatus 300 is leveled. In this regard, the shooter gets an indication that the spirit level vial 306 of the anti-cant indication apparatus 300 is leveled when the shooter sees the light 410 from the indicator end 316a of the second fiber 316.

FIG. 4C is an illustration depicting a top plan view of the anti-cant indication apparatus 300 with a canting by tilting the projectile launcher to the right relative to the vertical axis of the earth. In one embodiment, the anti-cant indication apparatus 300 may not be leveled. For example, the anti-cant indication apparatus 300 may be canted. By way of another example, the canting may be indicated by the light not passing through the spirit level vial 306 of the anti-cant indication apparatus 300. For instance, the air pocket 308 of the spirit level vial 306 may not be located at the center of the spirit level vial 306. In FIG. 4C, the air pocket 308 of the spirit level vial 306 is depicted to rest in the left portion of the spirit level vial 306. In this regard, the air pocket 308 of the spirit level vial 306 is not lined up with the light source 402 via the first fiber 302 and the light 404 from the light source 402 is blocked by the dark-colored fluid 307 of the spirit level vial 306. The shooter looking from the eyepiece of the projectile launcher scope equipped with the indicator end 316a of the second fiber 316 does not get the indication that the spirit level vial 306 of the anti-cant indication apparatus 300 is leveled.

FIGS. 12A-12D generally illustrate a side elevation view of the anti-cant indication apparatus 300 with and without a canting error, in accordance with one or more embodiments of the present disclosure.

Figure 12A:
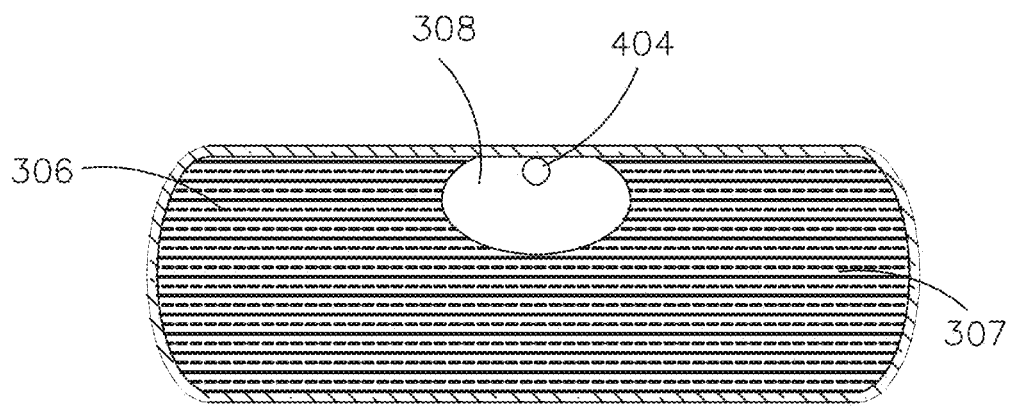
FIG. 12A illustrates a side cross-section view of a spirit level vial of the anti-cant indication apparatus without a canting error, in accordance with one or more embodiments of the present disclosure.
Figure 12B:
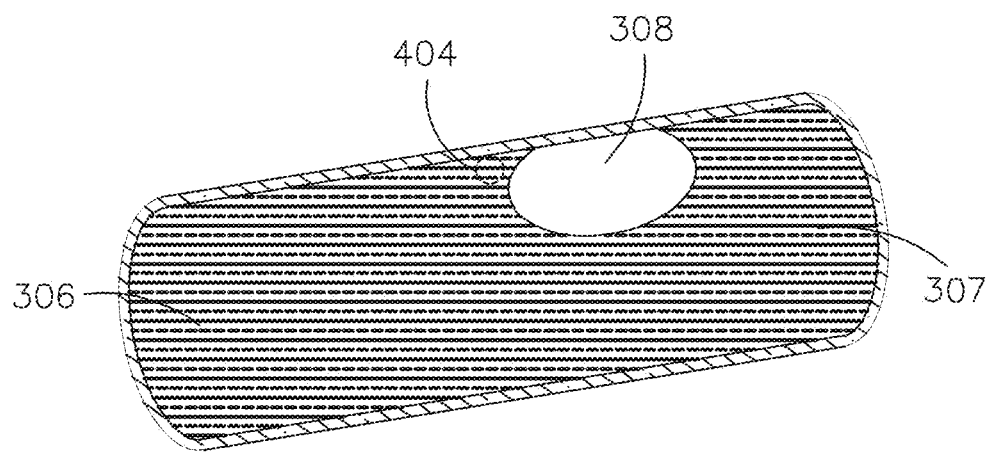
FIG. 12B illustrates a side cross-section view of a spirit level vial of the anti-cant indication apparatus with a canting error, in accordance with one or more embodiments of the present disclosure.
Figure 12C:
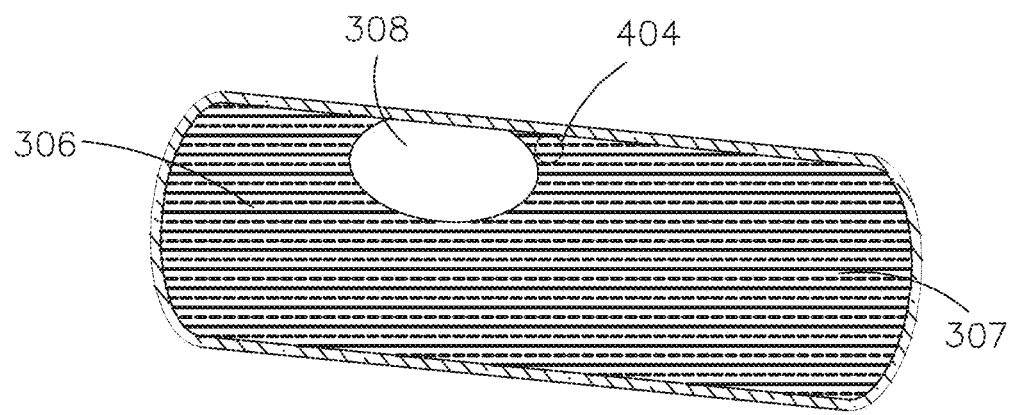
FIG. 12C illustrates a side cross-section view of a spirit level vial of the anti-cant indication apparatus with a canting error, in accordance with one or more embodiments of the present disclosure.
Figure 12D:
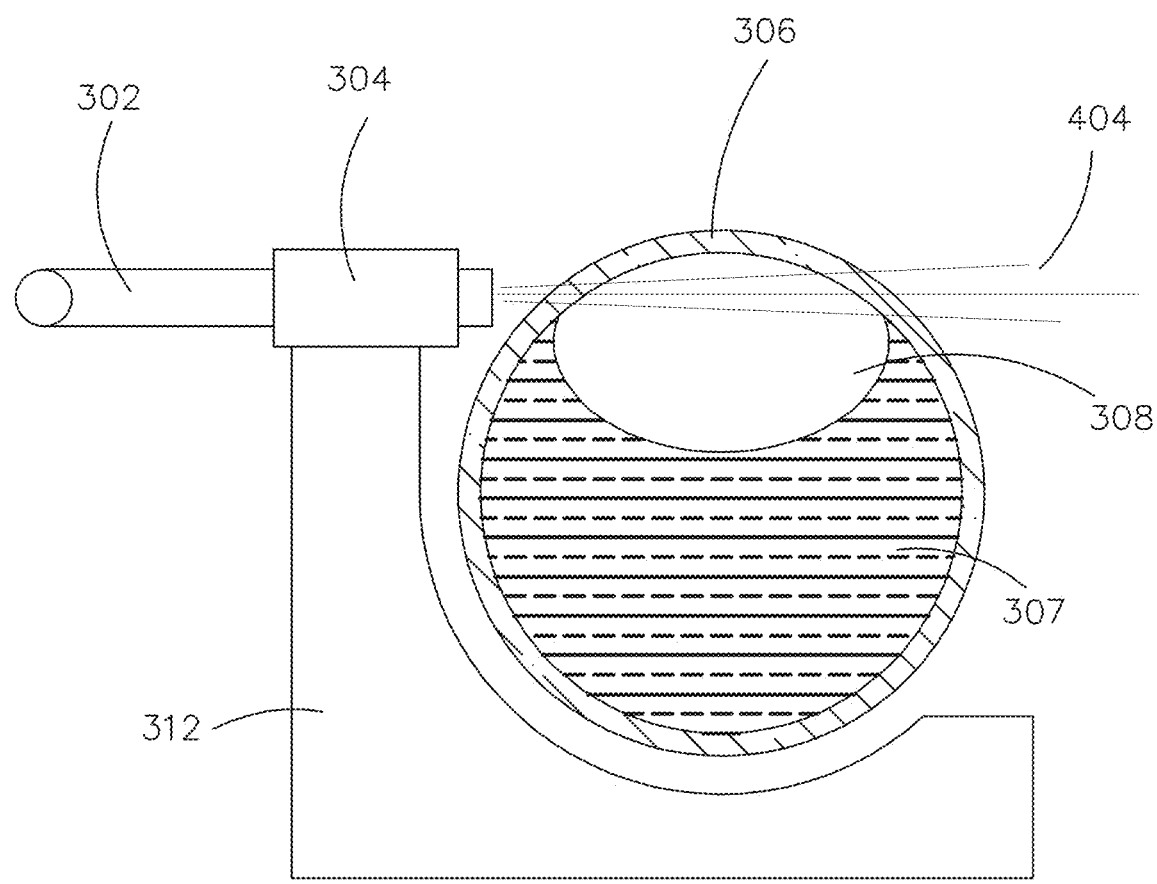
FIG. 12D illustrates an end cross-section view of the anti-cant indication apparatus without a canting error, in accordance with one or more embodiments of the present disclosure.

FIGS. 12A and 12D are illustrations depicting a side elevation view and end cross-section view of the anti-cant indication apparatus 300 including the spirit level vial 306 without a canting. In one embodiment, the anti-cant indication apparatus 300 may be leveled. For example, the anti-cant indication apparatus 300 may include the air pocket 308 of the spirit level vial 306 rested at the center of the spirit level vial 306. By way of another example, the air pocket 308 of the spirit level vial 306 may be transparent. For instance, the air pocket 308 of the spirit level vial 306 may transmit the light 404 as the light 410. In this regard, the shooter gets an indication that the spirit level vial 306 of the anti-cant indication apparatus 300 is leveled when the shooter sees the light 410.

FIG. 12B is an illustration depicting a side elevation view of the spirit level vial 306 of the anti-cant indication apparatus 300 with a canting by tilting the projectile launcher to the left relative to the vertical axis of the earth. In one embodiment, the anti-cant indication apparatus 300 may not be leveled. For example, the anti-cant indication apparatus 300 may be canted. By way of another example, the canting may be indicated by the light 404 not passing through the spirit level vial 306. In FIG. 12B, the air pocket 308 of the spirit level vial 306 is depicted to rest in the right portion of the spirit level vial 306. In this regard, the air pocket 308 of the spirit level vial 306 is not lined up with the light 404 and the light 404 is blocked by the dark-colored fluid 307 of the spirit level vial 306. The shooter looking from the eyepiece of the projectile launcher scope does not get the indication that the spirit level vial 306 of the anti-cant indication apparatus 300 is leveled.

FIG. 12C is an illustration depicting a side elevation view of the spirit level vial 306 of the anti-cant indication apparatus 300 with a canting by tilting the projectile launcher to the right relative to the vertical axis of the earth. In one embodiment, the anti-cant indication apparatus 300 may not be leveled. For example, the anti-cant indication apparatus 300 may be canted. By way of another example, the canting may be indicated by the light 404 not passing through the spirit level vial 306. In FIG. 12C, the air pocket 308 of the spirit level vial 306 is depicted to rest in the left portion of the spirit level vial 306. In this regard, the air pocket 308 of the spirit level vial 306 is not lined up with the light 404 and the light 404 is blocked by the dark-colored fluid 307 of the spirit level vial 306. The shooter looking from the eyepiece of the projectile launcher scope does not get the indication that the spirit level vial 306 of the anti-cant indication apparatus 300 is leveled.

Figure 13A:
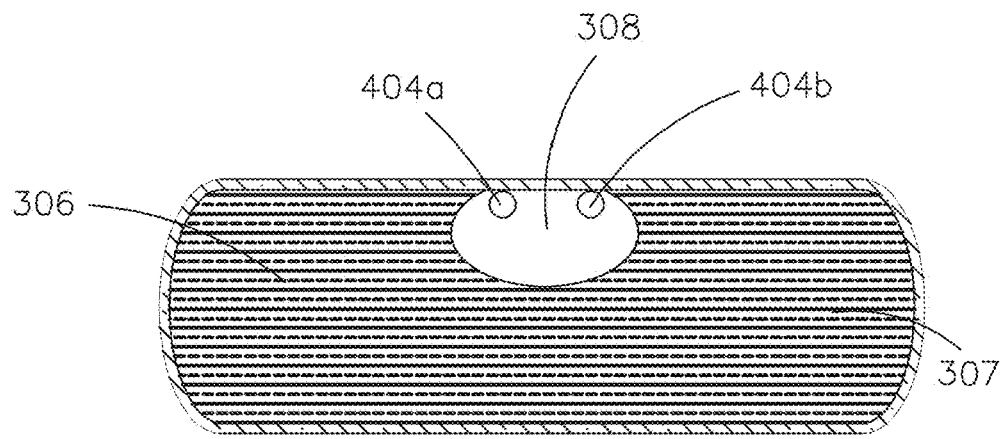
FIG. 13A illustrates a side cross-section view of a spirit level vial of the anti-cant indication apparatus without a canting error, in accordance with one or more embodiments of the present disclosure.
Figure 13B:
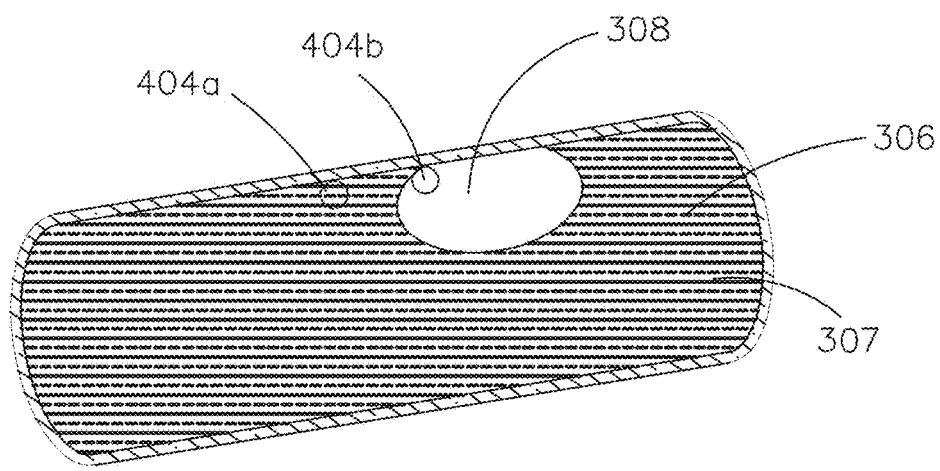
FIG. 13B illustrates a side cross-section view of a spirit level vial of the anti-cant indication apparatus with a canting error, in accordance with one or more embodiments of the present disclosure.
Figure 13C:
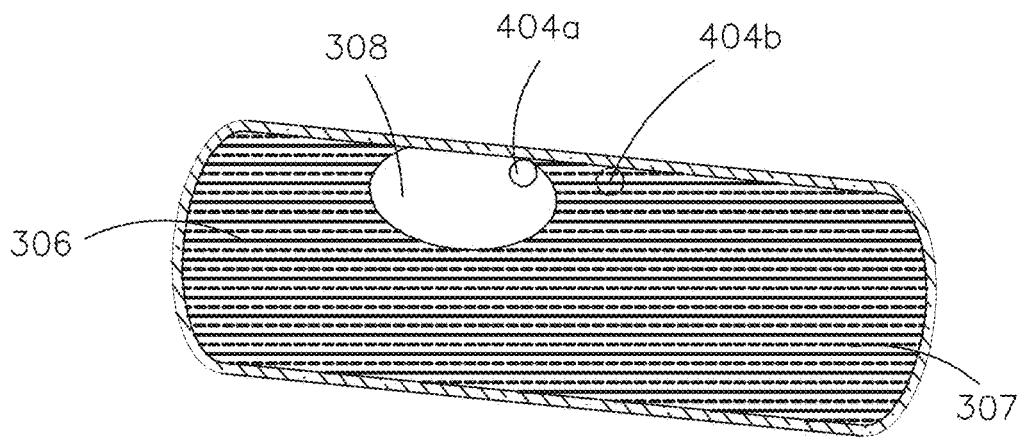
FIG. 13C illustrates a side cross-section view of a spirit level vial of the anti-cant indication apparatus with a canting error, in accordance with one or more embodiments of the present disclosure.

FIGS. 13A-13C generally illustrate the side elevation view of the anti-cant indication apparatus 300 with and without a canting error, in accordance with one or more embodiments of the present disclosure. In FIGS. 13A-13C, the light passing entering the spirit level vial 306 includes a first light 404a and at least a second light 404b, where illumination of the first light 404a and the at least the second light 404b indicates absolute dead center (e.g., uncanted). For example, the first light 404a may be directed to the spirit level vial 306 via a first fiber 302, and/or the at least the second light 404b may be directed to the spirit level vial 306 via at least a second fiber 302. By way of another example, the first light 404a may be transmitted through the spirit level vial 306 to a first fiber 316, and/or the at least the second light 404b may be transmitted through the spirit level vial 306 to at least a second fiber 316.

However, it is noted herein that the first light 404a and/or the at least the second light 404b may be directed to the spirit level vial 306 via a single fiber 302. In addition, it is noted herein that the first light 404a and/or the at least the second light 404b may be transmitted through the spirit level vial 306 to a single fiber 316.

FIG. 13A is an illustration depicting a side elevation view of the spirit level vial 306 without a canting. In one embodiment, the anti-cant indication apparatus 300 may be leveled. For example, the anti-cant indication apparatus 300 may include the air pocket 308 of the spirit level vial 306 rested at the center of the spirit level vial 306. By way of another example, the air pocket 308 of the spirit level vial 306 may be transparent. For instance, the air pocket 308 of the spirit level vial 306 may transmit the first light 404a and the at least the second light 404b as a first transmitted light and at least a second transmitted light (e.g., a first transmitted light 410 and at least a second transmitted light 410). In this regard, the shooter gets an indication that the spirit level vial 306 of the anti-cant indication apparatus 300 is leveled when the shooter sees the first transmitted light and the at least the second transmitted light (e.g., the first transmitted light 410 and the at least the second transmitted light 410).

FIG. 13B is an illustration depicting a side elevation view of the spirit level vial 306 of the anti-cant indication apparatus 300 with a canting by tilting the projectile launcher to the left relative to the vertical axis of the earth. In one embodiment, the anti-cant indication apparatus 300 may not be leveled. For example, the anti-cant indication apparatus 300 may be canted. By way of another example, the canting may be indicated by the first light 404a and/or the at least the second light 404b not passing through the spirit level vial 306. In FIG. 13B, the air pocket 308 of the spirit level vial 306 is depicted to rest in the right portion of the spirit level vial 306. In this regard, the air pocket 308 of the spirit level vial 306 is not lined up with the first light 404a and/or the at least the second light 404b, and the first light 404a and/or the at least the second light 404b is blocked by the dark-colored fluid 307 of the spirit level vial 306. The shooter looking from the eyepiece of the projectile launcher scope does not get the indication that the spirit level vial 306 of the anti-cant indication apparatus 300 is leveled.

FIG. 13C is an illustration depicting a side elevation view of the spirit level vial 306 of the anti-cant indication apparatus 300 with a canting by tilting the projectile launcher to the right relative to the vertical axis of the earth. In one embodiment, the anti-cant indication apparatus 300 may not be leveled. For example, the anti-cant indication apparatus 300 may be canted. By way of another example, the canting may be indicated by the at least the second light 404b and/or the first light 404a not passing through the spirit level vial 306. In FIG. 13C, the air pocket 308 of the spirit level vial 306 is depicted to rest in the left portion of the spirit level vial 306. In this regard, the air pocket 308 of the spirit level vial 306 is not lined up with the at least the second light 404b and/or the first light 404a, and the at least the second light 404b and/or the first light 404a is blocked by the dark-colored fluid 307 of the spirit level vial 306. The shooter looking from the eyepiece of the projectile launcher scope does not get the indication that the spirit level vial 306 of the anti-cant indication apparatus 300 is leveled.

The first light 404a and the at least the second light 404b may be the same color. It is noted herein, however, that the first light 404a and the at least the second light 404b may be different colors. For example, the first light 404a may be a first color and the at least the second light 404b may be at least a second color, allowing a user to differentiate in which direction the spirit level vial 306 is canted based on which color the user sees. The first light 404a and the at least the second light 404b may both be illuminated when the spirit level vial 306 is uncanted. The first color and the at least the second color may be complementary, generating additional colors when both the first light 404a and the at least the second light 404b are aligned with the air pocket 308 that indicates when the spirit level vial 306 is uncanted.

Figure 14A:
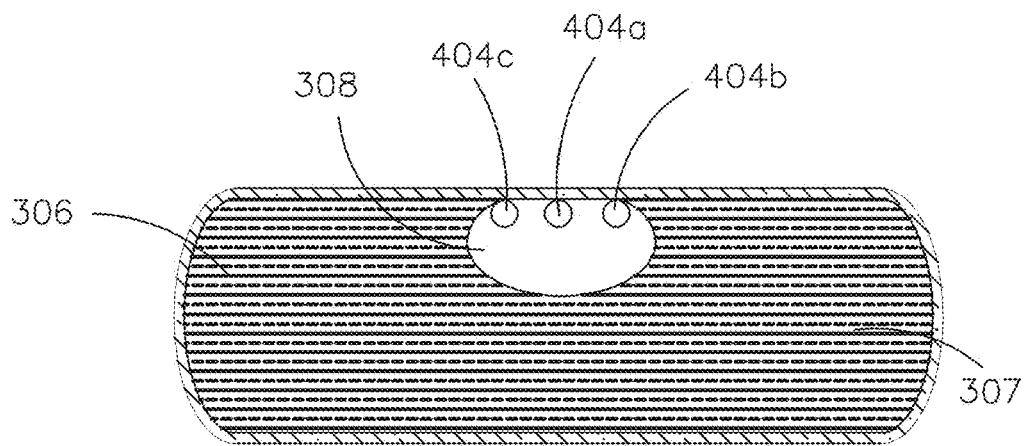
FIG. 14A illustrates a side cross-section view of a spirit level vial of the anti-cant indication apparatus without a canting error, in accordance with one or more embodiments of the present disclosure.
Figure 14B:
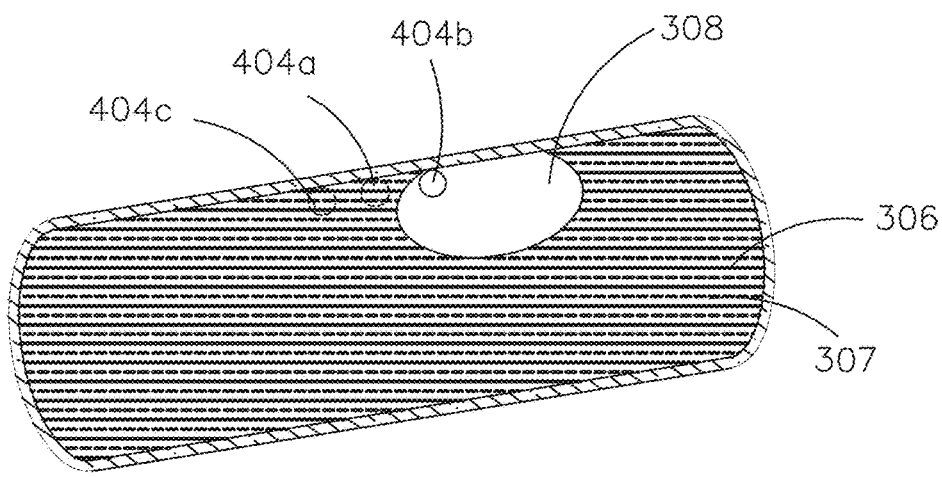
FIG. 14B illustrates a side cross-section view of a spirit level vial of the anti-cant indication apparatus with a canting error, in accordance with one or more embodiments of the present disclosure.
Figure 14C:
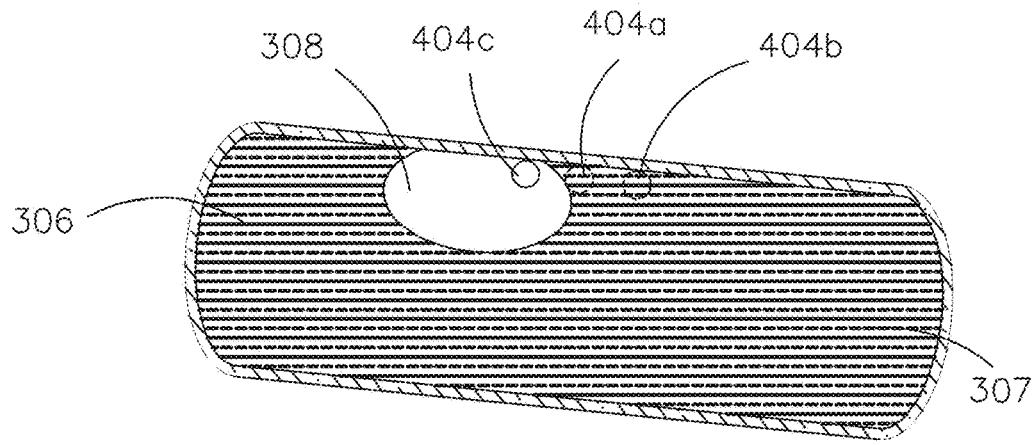
FIG. 14C illustrates a side cross-section view of a spirit level vial of the anti-cant indication apparatus with a canting error, in accordance with one or more embodiments of the present disclosure.

FIGS. 14A-14C generally illustrate the side elevation view of the anti-cant indication apparatus 300 with and without a canting error, in accordance with one or more embodiments of the present disclosure. In FIGS. 14A-14C, the light passing entering the spirit level vial 306 includes a first light 404a, a second light 404b, and at least a third light 404c, where illumination of the first light 404a, the second light 404b, and the at least the third light 404c indicates absolute dead center (e.g., uncanted). For example, the first light 404a may be directed to the spirit level vial 306 via a first fiber 302, the second light 404b may be directed to the spirit level vial 306 via a second fiber 302, and/or the at least the third light 404c may be directed to the spirit level vial 306 via at least a third fiber 302. By way of another example, the first light 404a may be transmitted through the spirit level vial 306 to a first fiber 316, the second light 404b may be transmitted through the spirit level vial 306 to a second fiber 316, and/or the at least the third light 404c may be transmitted through the spirit level vial 306 to at least a third fiber 316.

However, it is noted herein that the first light 404a, the second light 404b, and/or the at least the third light 404c may be directed to the spirit level vial 306 via a single fiber 302 or a set of fibers 302. In addition, it is noted herein that the first light 404a, the second light 404b, and/or the at least the third light 404c may be transmitted through the spirit level vial 306 to a single fiber 316 or a set of fibers 316.

FIG. 14A is an illustration depicting a side elevation view of the spirit level vial 306 without a canting. In one embodiment, the anti-cant indication apparatus 300 may be leveled. For example, the anti-cant indication apparatus 300 may include the air pocket 308 of the spirit level vial 306 rested at the center of the spirit level vial 306. By way of another example, the air pocket 308 of the spirit level vial 306 may be transparent. For instance, the air pocket 308 of the spirit level vial 306 may transmit the first light 404*a*, the second light 404*b*, and the at least the third light 404*c* as a first transmitted light, a second transmitted light, and at least a third transmitted light (e.g., a first transmitted light 410, a second transmitted light 410, and at least a third transmitted light 410). In this regard, the shooter gets an indication that the spirit level vial 306 of the anti-cant indication apparatus 300 is leveled when the shooter sees the first transmitted light, the second transmitted light, and the at least the third transmitted light (e.g., the first transmitted light 410, the second transmitted light 410, and the at least the third transmitted light 410).

FIG. 14B is an illustration depicting a side elevation view of the spirit level vial 306 of the anti-cant indication apparatus 300 with a canting by tilting the projectile launcher to the left relative to the vertical axis of the earth. In one embodiment, the anti-cant indication apparatus 300 may not be leveled. For example, the anti-cant indication apparatus 300 may be canted. By way of another example, the canting may be indicated by the first light 404*a*, the second light 404*b*, and/or the at least the third light 404*c* not passing through the spirit level vial 306. In FIG. 14B, the air pocket 308 of the spirit level vial 306 is depicted to rest in the right portion of the spirit level vial 306. In this regard, the air pocket 308 of the spirit level vial 306 is not lined up with the first light 404*a*, the second light 404*b*, and/or the at least the third light 404*c*, and the first light 404*a*, the second light 404*b*, and/or the at least the third light 404*c* is blocked by the dark-colored fluid 307 of the spirit level vial 306. The shooter looking from the eyepiece of the projectile launcher scope does not get the indication that the spirit level vial 306 of the anti-cant indication apparatus 300 is leveled.

FIG. 14C is an illustration depicting a side elevation view of the spirit level vial 306 of the anti-cant indication apparatus 300 with a canting by tilting the projectile launcher to the right relative to the vertical axis of the earth. In one embodiment, the anti-cant indication apparatus 300 may not be leveled. For example, the anti-cant indication apparatus 300 may be canted. By way of another example, the canting may be indicated by the second light 404*b*, the at least the third light 404*c*, and/or the first light 404*a* not passing through the spirit level vial 306. In FIG. 14C, the air pocket 308 of the spirit level vial 306 is depicted to rest in the left portion of the spirit level vial 306. In this regard, the air pocket 308 of the spirit level vial 306 is not lined up with the second light 404*b*, the at least the third light 404*c*, and/or the first light 404*a*, and the second light 404*b*, the at least the third light 404*c*, and/or the first light 404*a* is blocked by the dark-colored fluid 307 of the spirit level vial 306. The shooter looking from the eyepiece of the projectile launcher scope does not get the indication that the spirit level vial 306 of the anti-cant indication apparatus 300 is leveled.

The first light 404*a*, the second light 404*b*, and the at least the third light 404*c* may be the same color. It is noted herein, however, that some or all of the first light 404*a*, the second light 404*b*, and the at least the third light 404*c* may be different colors. For example, the first light 404*a* may be a first color, while the second light 404*b* and the at least the third light 404*c* may be at least a second color, allowing a user to differentiate in which direction the spirit level vial 306 is canted based on which color the user sees. By way of another example, the first light 404*a* may be a first color, the second light 404*b* may be a second color, and the at least the third light 404*c* may be at least a third color, allowing a user to more easily differentiate in which direction the spirit level vial 306 is canted based on which color the user sees. The first light 404*a*, the second light 404*b*, and the at least the third light 404*c* may all be illuminated when the spirit level vial 306 is uncanted. The first color, the second color, and/or the at least the third color may be complementary, generating additional colors when both the first light 404*a*, the second light 404*b*, and the at least the third light 404*c* are aligned with the air pocket 308 that indicates when the spirit level vial 306 is uncanted.

FIGS. 5A-5C generally illustrate a rifle shooter's views of the anti-cant indication apparatus 300 with and without a canting error, in accordance with one or more embodiments of the present disclosure. It is noted herein that the embodiments and components described previously herein with respect to the apparatus 300 should be interpreted to extend to the embodiments described in FIGS. 5A-5C. FIGS. 5A and 5C depict canting effects on both the angles of a rifle relative to the vertical axis of the earth and the impact points. The shooter's views shown in FIGS. 5A-5C correspond to the spirit level vial configurations shown in FIGS. 4A-4C.

FIG. 5A is an illustration depicting a rifle shooter's view of the anti-cant indication apparatus 300 with a canting by tilting a rifle to the left relative to the vertical axis of the earth. In one embodiment, a rifle shooter's view 500 may include a rifle 502, a rifle scope 504 (e.g., with eyepiece), a target 506, a bullet trajectory 508, and an impact point 510 of the bullet. The light collecting end 302*a* of the first fiber 302, the first fiber 302, the spirit level vial 306, the second fiber 316, and/or the indicator end 316*a* of the second fiber of the anti-cant indication apparatus 300 are shown in FIG. 5A to demonstrate the effectiveness of the anti-cant indication apparatus 300 and a mounting configuration of the anti-cant indication apparatus 300 on the rifle 502 from the rifle shooter's view 500. It is noted that the rifle shooter's view 500 shown in FIG. 5A is provided to show an exaggerated canting view for the purpose of illustration.

In general, when the canting is introduced, the rifle 502 and the rifle scope 504 may be tilted relative to the vertical axis of the earth. In this case 500, the rifle 502 and the rifle scope 504 may be tilted to the left relative to the vertical axis of the earth, which moves the air pocket 308 of the spirit level vial 306 to the right portion of the spirit level vial 306 as shown in FIGS. 4A, 12B, 13B, and 14B. It is noted that under this condition the lights 404, 404*a*, 404*b*, and/or 404*c* from the light source 402 is not (or the light sources 402 are not) transmitted through the air pocket 308 of the spirit level vial 306 and this results in no indicator light 410 (or a subset (e.g., less than all) or none of the indicator lights 410) lit at the indicator end 316*a* of the second fiber 316 as shown in FIGS. 4A and 5A. This translates that the bullet trajectory 508 from the rifle 502 is also projected to the left of the target 506. This bullet trajectory 508 forces the bullet from the rifle 502 to land on the impact point 510, which is on lower left side of the target 506. This results in missing the target 506.

FIG. 5B is an illustration depicting a rifle shooter's view of the anti-cant indication apparatus 300 without a canting of a rifle. A shooter's view 525 shows that the rifle 502 and the rifle scope 504 are perfectly leveled utilizing the anti-cant indication apparatus 300, which moves the air pocket 308 of the spirit level vial 306 to the center portion of the spirit level vial 306 as shown in FIGS. 4B, 12A, 12D, 13A, and 14A. Under this condition, the lights 404, 404*a*, 404*b*, and/or 404*c* from the light source 402 lines up (or light sources 402 line up) with the air pocket 308 of the spirit level vial 306, which transmits the lights 404, 404*a*, 404*b*, and/or 404*c* from the first fiber 302 (or fibers 302) to the second fiber 316 (or fibers 316) and reaches the indicator end 316a of the second fiber 316 (or fibers 316). This generates the light 410 (or lights 410) at the indicator end 316a to indicate that the rifle 502 and the rifle scope 504 are not canted. The light 410 is (or the lights 410 are) observable from the shooter's view 525 at the indicator end 316a as shown in FIG. 5B. In response, the bullet from the rifle 502 travels straight to the target 506 via the bullet trajectory 508 and the impact point 510 and the center of the target 506 are perfectly lined up. It should be noted that a lack of illumination may indicate an uncanted orientation and at least some level of illumination may indicate a canted orientation depending on the light transmittance and/or absorbance of the bubble fluid. Likewise, illumination may indicate an uncanted orientation and at least some level of partial illumination may indicate a canted orientation depending on the light transmittance and/or absorbance of the bubble fluid.

FIG. 5C is an illustration depicting a rifle shooter's view of the anti-cant indication apparatus 300 with a canting by tilting the rifle to the right relative to the vertical axis of the earth. It is noted that a rifle shooter's view 550 shown in FIG. 5C is provided to show an exaggerated canting view for the purpose of illustration.

In general, when the canting is introduced, the rifle 502 and the rifle scope 504 may be tilted relative to the vertical axis of the earth. In this case 550, the rifle 502 and the rifle scope 504 may be tilted to the right relative to the vertical axis of the earth, which moves the air pocket 308 of the spirit level vial 306 to the left portion of the spirit level vial 306 as shown in FIGS. 4C, 12C, 13C, and 14C. It is noted that under this condition the lights 404, 404a, 404b, and/or 404c from the light source 402 is not (or the light sources 402 are not) transmitted through the air pocket 308 of the spirit level vial 306 and this results in no indicator light 410 (or a subset (e.g., less than all) or none of the indicators lights 410) lit at the indicator end 316a of the second fiber 316 as shown in FIGS. 4C and 5C. This translates that the bullet trajectory 508 from the rifle 502 is also projected to the right of the target 506. This bullet trajectory 508 forces the bullet from the rifle 502 to land on the impact point 510, which is on lower right side of the target 506. This results in missing the target 506.

It is noted that the anti-cant indication apparatus 300 does not require the shooter to look at two physically separated sites to check whether or not the rifle and/or the rifle scope is leveled as demonstrated and shown in FIGS. 5A-5C. Since the indicator end 316a of the second fiber 316 of the anti-cant indication apparatus 300 is attached to the eyepiece of the rifle scope 504, the light 410 from the anti-cant indication apparatus 300 may be easily recognizable by one eye. This may reduce a subtle canting error significantly because an eyesight from the shooter captures both a rifle scope lens (e.g., eyepiece, exit pupil, or the like) and the indicator end 316a of the anti-cant indication apparatus 300 at the same time.

It is contemplated that, while the indicator end 316a of the second fiber 316 is attached on bottom right portion of the rifle scope 504 eyepiece shown in FIGS. 5A-5C, such a configuration is merely provided for illustrative purposes. Embodiments of the present disclosure may be configured to be equipped with the indicator end 316a of the second fiber 316 on any position of the rifle scope eyepiece, such as, but not limited to, on the top, bottom, right side, or left side of the riflescope 504 eyepiece.

FIG. 6 illustrates a mounting configuration 600 of the anti-cant indication apparatus 300, in accordance with one or more embodiments of the present disclosure. It is noted herein that the embodiments and components described previously herein with respect to the apparatus 300 should be interpreted to extend to the embodiments described in FIG. 6.

In general, a level for a rifle can be mounted directly on a rifle. For example, the level mounted on the rifle is typically placed on a flat portion of the rifle such as, but not limited to, a Weaver rail mount or Picatinny rail (or the like). Also, the level for a rifle can be mounted directly on a rifle scope. For example, the level mounted on the rifle scope is typically placed on a flat portion of the rifle scope including, but not limited to, a top of a rifle scope tube or a side of the rifle scope tube (via an adapter or the like). The spirit level vial 306 of the anti-cant indication apparatus 300 in the present disclosure may be mounted perpendicular to the axis of the barrel on any flat portion of the rifle as well as the rifle scope.

In one embodiment, the anti-cant indication apparatus 300 may be mounted on a rifle 602. For example, the anti-cant indication apparatus 300 may be mounted on a flat surface of a top of the rifle 602. The spirit level vial 306 of the anti-cant indication apparatus 300 may be placed perpendicular to the rifle 602 in order to correctly detect canting of the rifle 602. By way of another example, the flat surface of the top of the rifle 602 may include a mounting rail 606 of the rifle 602. For instance, the anti-cant indication apparatus 300 may be fixed on top of the rifle 602 by any attaching method known in the art, such as, but not limited to, a magnet, a clip, a screw, a bolt, a clamp, a VELCRO, a tie, or an adhesive (e.g., a glue, or the like).

In some embodiments, the anti-cant indication apparatus 300 may be mounted on a rifle scope 604. For example, the anti-cant indication apparatus 300 may be mounted on a flat surface of a top of the rifle scope 604. The spirit level vial 306 of the anti-cant indication apparatus 300 may be placed perpendicular to the rifle 602 in order to correctly detect canting of the rifle 602. By way of another example, the flat surface of the top of the rifle scope 604 may include, but is not limited to, scope holders 608, a protection cap or elevation adjustment cap 610, or a scope tube 612. For instance, the anti-cant indication apparatus 300 may be fixed on top of the rifle scope 604 by any attaching method known in the art, such as, but not limited to, a magnet, a clip, a screw, a bolt, a clamp, a VELCRO, a tie, or an adhesive (e.g., a glue, or the like).

In some embodiments, the spirit level vial 306 of the anti-cant indication apparatus 300 may be mounted on any flat vertical surface of the rifle scope 604 including, but not limited to, scope holders 608, a scope tube 612, a windage adjustment cap 614, or a side focus adjustment cap (not shown) using the spirit level vial anchor 312 (e.g., magnetic plates, or the like) of the anti-cant indication apparatus 300. In some embodiments, the spirit level vial 306 of the anti-cant indication apparatus 300 may be securely installed with the spirit level vial anchor 312 (e.g., magnetic plates, or the like) on the flat vertical surface of the rifle scope 604 so that the spirit level vial 306 is perpendicular to the rifle 602 in order to correctly detect a canting of the rifle 602.

In one embodiment, the light collecting end 302a of the first fiber 302 may be faced toward a natural light source. For example, the light collecting end 302a of the first fiber 302 may be fixed on top of the rifle scope 604 so as to collect natural light effectively.

It is contemplated that, while the light collecting end 302a of the first fiber 302 shown in FIG. 6 is mounted on top of the rifle scope 604, such a configuration is merely provided for illustrative purposes. The present disclosure may be configured to adapt other mounting locations such as, but not limited to, a side of the rifle scope 604, a top of the rifle 602, or a side of the rifle 602.

In some embodiments, the anti-cant indication apparatus 300 may collect natural light directly to the spirit level vial 306. In this regard, the first fiber 302 of the anti-cant indication apparatus 300 may not be required (not shown). For example, when the spirit level vial 306 of the anti-cant indication apparatus 300 is placed on top of the rifle scope 604 including, but not limited to, scope holders 608, a scope tube 612, a windage adjustment cap 614, or a side focus adjustment cap (not shown), light (e.g., from the sun) may be utilized by the anti-cant indication apparatus 300. When the rifle scope 604 is leveled, the light (e.g., from the sun) passes through the air pocket in the spirit level vial 306 of the anti-cant indication apparatus 300 and light the indicator end 316a of the second fiber 316 attached to the eyepiece of the rifle scope 604.

In some embodiments, the light collecting end 302a of the first fiber 302 may be connected to an artificial light source including, but not limited to, a light-emitting diode (LED). For example, the artificial light source may provide the light to the spirit level vial 306 via the light collecting end 302a of the first fiber 302 so as to send the light indication to the shooter at the indicator end 316a via the second fiber 316 when the spirit level vial does not experience a canting. This may be beneficial when there is not enough natural light available in the hunting field.

It is contemplated that, while the lengths of the first fiber 302 and the second fiber 316 shown in FIG. 6 are depicted such that the first fiber 302 is longer than the second fiber 316, such a configuration is merely provided for illustrative purposes. The present disclosure may be configured to include various lengths of the first fiber 302 and the second fiber 316 depending on an installation location of the anti-cant indication apparatus 300 on the rifle 602 or the rifle scope 604.

It is contemplated that, while a routing of the first fiber 302 and the second fiber 316 shown in FIG. 6 is selected so as to minimize bending of both the first fiber 302 and the second fiber 316, such a routing configuration is merely provided for illustrative purposes. The present disclosure may be configured to adapt other routings of the first fiber 302 and the second fiber 316.

It is noted that the size of the anti-cant indication apparatus 300 shown in FIG. 6 is merely provided for illustrative purposes and is not a limitation of the present disclosure. It is further noted that the anti-cant indication apparatus 300 may be incorporated into other optics including, but not limited to, telescopes or microscopes.

Figure 7:
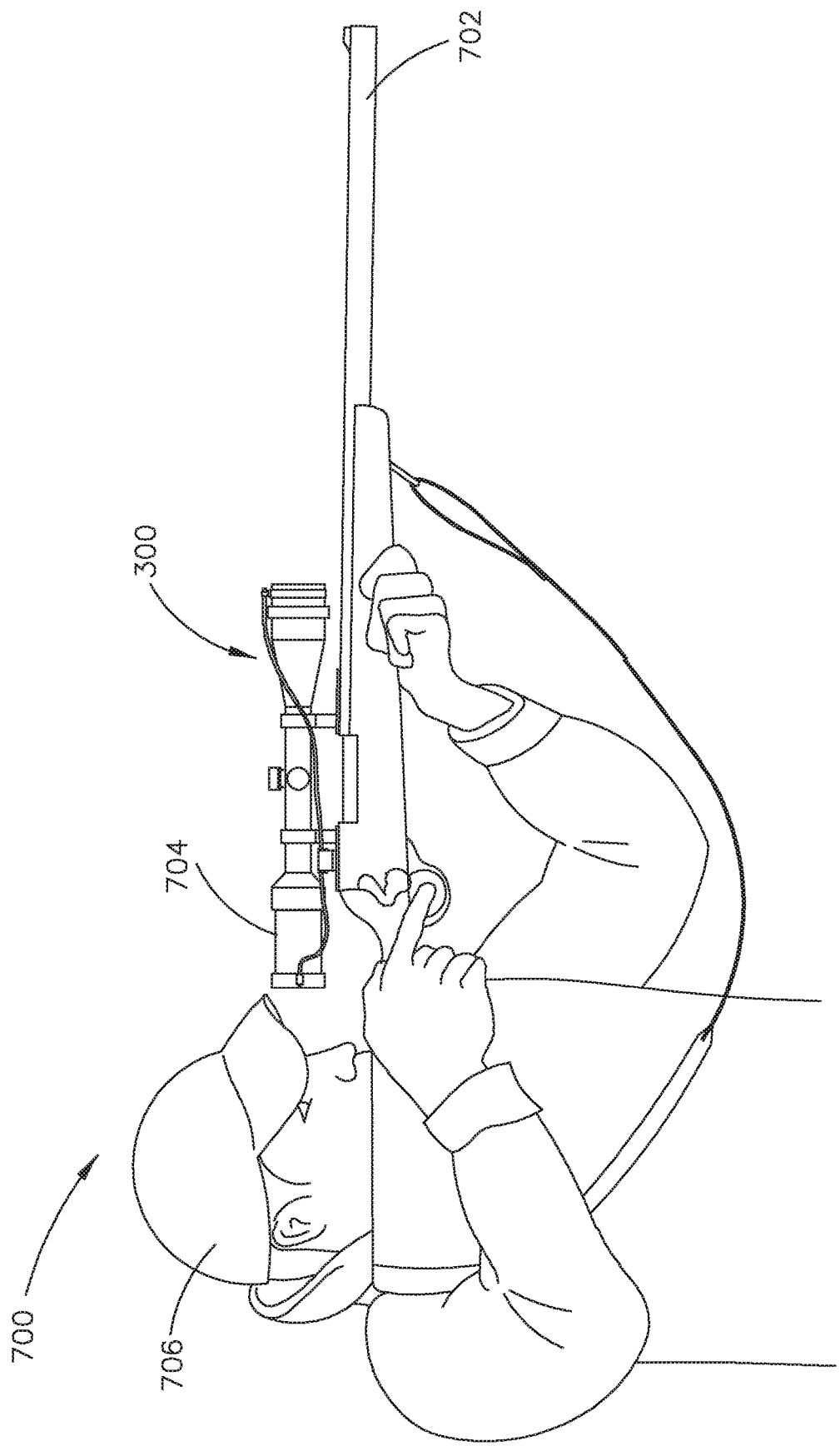
FIG. 7 illustrates a rifle shooting position with a rifle equipped with the anti-cant indication apparatus, in accordance with one or more embodiments of the present disclosure.

FIG. 7 illustrates a shooting position with a rifle equipped with the anti-cant indication apparatus 300, in accordance with one or more embodiments of the present disclosure. It is noted herein that the embodiments and components described previously herein with respect to the apparatus 300 should be interpreted to extend to the embodiments described in FIG. 7.

In one embodiment, a rifle shooting position 700 may include a rifle 702. In some embodiments, the rifle shooting position 700 may include a rifle scope 704 mounted on the rifle 702. In some embodiments, the rifle shooting position 700 may include the anti-cant indication apparatus 300 installed on a top flat surface of a mounting rail of the rifle 702. The indicator end 316a of the anti-cant indication apparatus 300 is attached on the eyepiece of the rifle 702. In some embodiments, the rifle shooting position 700 may include a shooter 706 holding a rifle assembly (e.g., the rifle 702 and the anti-cant indication apparatus 300 coupled to the rifle 702 and/or the rifle scope 704).

It is noted that the shooter 706 looking at the rifle 702 and/or the rifle scope 704 is able to see the light shining from the indicator end 316a of the anti-cant indication apparatus 300 with great ease when the rifle 702 experiences no canting. It is further noted that in order for the shooter 706 to use the anti-cant indication apparatus 300 effectively, no special shooting position is required.

Figure 8:
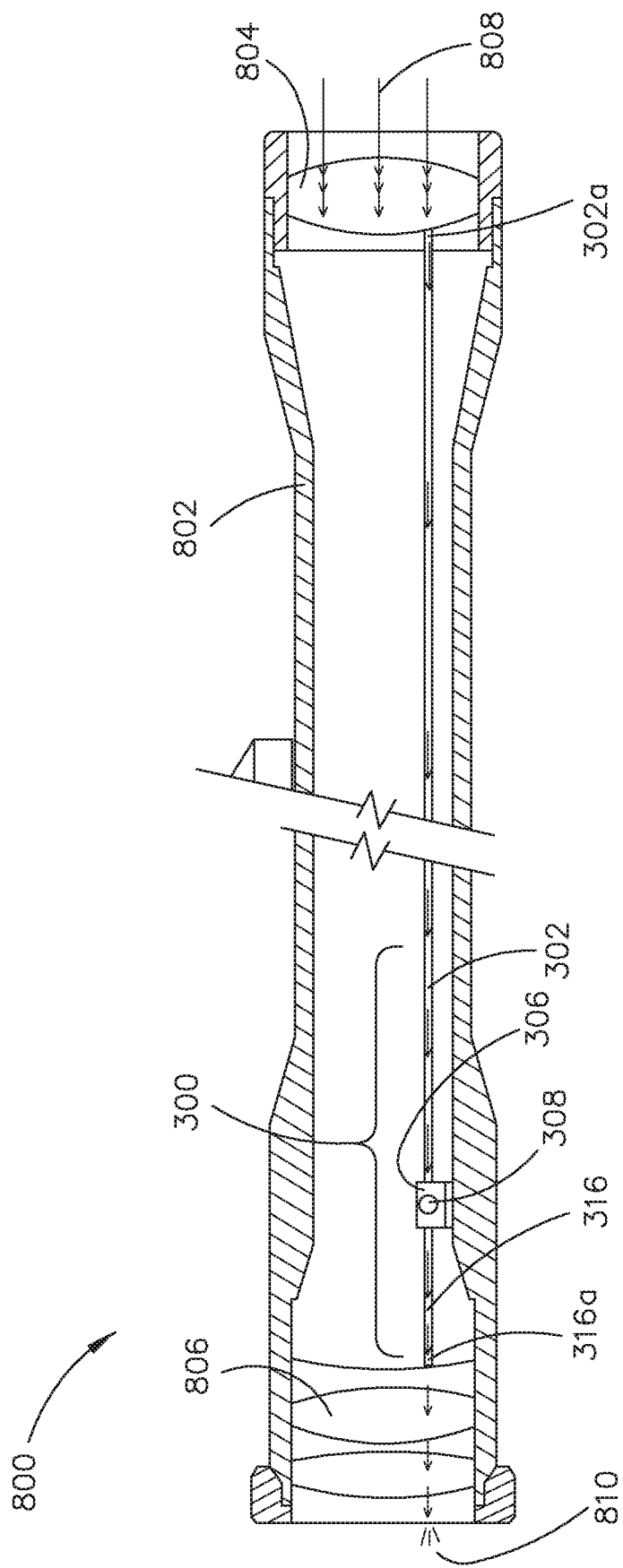
FIG. 8 illustrates a simplified rifle scope internal structure incorporated with the anti-cant indication apparatus, in accordance with one or more embodiments of the present disclosure.

FIG. 8 illustrates a simplified rifle scope internal structure incorporated with the anti-cant indication apparatus 300, in accordance with one or more embodiments of the present disclosure. It is noted herein that the embodiments and components described previously herein with respect to the apparatus 300 should be interpreted to extend to the embodiments described in FIG. 8.

In one embodiment, the rifle scope internal structure 800 may include a scope tube 802 enclosing various optical components inside the rifle scope. In some embodiments, the rifle scope internal structure 800 may include an objective lens assembly 804 for collecting light to form an image. In some embodiments, the rifle scope internal structure 800 may include an ocular lens assembly 806 (e.g., eyepiece) for magnifying the image.

In some embodiments, the rifle scope internal structure 800 may include the anti-cant indication apparatus 300 inside the scope tube 802. For example, the light collecting end 302a of the first fiber 302 of the anti-cant indication apparatus 300 may be positioned close to the objective lens assembly 804 so as to collect light 808 effectively. In some embodiments, the spirit level vial 306 of the anti-cant indication apparatus 300 may be placed on a flat surface of the internal rifle scope. For example, the spirit level vial 306 of the anti-cant rifle indication apparatus 300 may be placed perpendicular to the rifle scope in order to correctly detect canting of the rifle scope. In some embodiments, the indicator end 316a of the second fiber 316 of the anti-cant indication apparatus 300 may be positioned close to the ocular lens assembly 806 so as to send the indicator light 810 to the eyepiece of the rifle scope.

It is contemplated that, while the spirit level vial 306 of the anti-cant indication apparatus 300 shown in FIG. 8 is placed closer to the ocular lens assembly 806, such a configuration is merely provided for illustrative purposes. The present disclosure may be configured to adapt other level installation sites including, but not limited to, a site closer to the objective lens assembly 804, or a site in between the objective lens assembly 804 and the ocular lens assembly 806.

Although the descriptions provided in FIGS. 3A-8 illustrate a rifle, it is noted herein that the descriptions provided in FIGS. 3A-8 may be extended to any firearm (e.g., shotgun, pistol, or the like) known in the art. For example, the descriptions provided for the rifle 502, 602, 702 may be extended to a firearm 502, 602, 702. By way of another example, the descriptions provided for the rifle scope 504, 604, 704, and the rifle scope internal structure 800 may be extended to a firearm scope 504, 604, 704 and a firearm scope internal structure 800.

FIG. 9 illustrates a bow scope 900 including the anti-cant indication apparatus 300, in accordance with one or more embodiments of the present disclosure. It is noted herein that the embodiments and components described previously herein with respect to the apparatus 300 should be interpreted to extend to the embodiments described in FIGS. 9A-9D.

In general, a level for a bow can be mounted directly on a bow. For example, the level can be mounted on a portion of the bow such as, but not limited to, a surface of a bow riser a surface of a halo sight (e.g., directly, via an adapter, or the like). Also, the level for a bow can be mounted on a bow scope. For example, the level can be mounted on a portion of the bow scope including, but not limited to, a surface of a halo sight (e.g., directly, via an adapter, or the like). The spirit level vial 306 of the anti-cant indication apparatus 300 in the present disclosure may be mounted perpendicular to the axis of an arrow on any surface of the bow or the bow scope configured to support the spirit level vial 306 of the anti-cant indication apparatus 300.

In one embodiment, the anti-cant indication apparatus 300 may be mounted on a bow. For example, the anti-cant indication apparatus 300 may be mounted on a flat surface of a riser or sight window of the bow. The spirit level vial 306 of the anti-cant indication apparatus 300 may be placed perpendicular to the bow in order to correctly detect canting of the rifle. For instance, the anti-cant indication apparatus 300 may be fixed on top of the bow by any attaching method known in the art, such as, but not limited to, a magnet, a clip, a screw, a bolt, a clamp, a VELCRO, a tie, or an adhesive (e.g., a glue, or the like).

In some embodiments, the anti-cant indication apparatus 300 may be mounted on the bow scope 900, where the bow scope 900 is coupled to a bow via an arm 902 (e.g., horizontal extension bar, or the like). For example, the anti-cant indication apparatus 300 may be mounted on a surface of a sight housing 904 of the bow scope 900. For instance, the surface may include an interior surface, where the sight housing is ring-shaped. The spirit level vial 306 of the anti-cant indication apparatus 300 may be placed perpendicular to the bow in order to correctly detect canting of the bow. It is noted herein that the bow scope 900 may be retrofitted with the anti-cant indication apparatus 300, and/or may be initially designed to incorporate the anti-cant indication apparatus 300.

The sight housing 904 may be coupled to the arm 902 via one or more adjustable sight placements. For example, the one or more sight adjustment components may include one or more horizontal adjustable sight placements 906, one or more vertical adjustable sight placements 906, or the like. It is noted herein the sight housing 904 may be directly coupled to the arm 902 (e.g., is fixed).

The sight housing 904 may include, but is not limited to, one or more mount brackets 908 fixing in place one or more pin sights 910. For example, the one or more pin sights 910 may include one or more optical fibers, where the one or more optical fibers are positioned to include an open end pointed toward a shooter. For instance, the one or more optical fibers may pass through the sight housing 904 and be fixed to and/or wrapped around an exterior surface of the sight housing 904, such that natural light (e.g., sunlight) may enter the one or more optical fibers and illuminate the open end of the one or more optical fibers pointed toward the shooter. In addition, the one or more optical fibers may be a single color or be multi-colored.

It is noted herein, however, that the sight housing 904 may only include the one or more pin sights 910 (e.g., may not include the one or more mount brackets 908). In addition, it is noted herein, that the sight housing 904 may not include the one or more mount brackets 908 or the one or more pin sights 910. Further, it is noted herein the sight housing 904 may include one or more apertures (e.g., circular housings, rectangular housings, or the like) with a clear surface including a crosshair through which the shooter views a target, where the crosshair may include a pin or dot in the center, instead of or in addition to the one or more mount brackets 908 and/or the one or more pin sights 910.

The sight housing 904 may include one or more fibers 302 of the anti-cant indication apparatus 300, where an end pointed toward the shooter is held in place via a fiber optic anchor 914. For example, one or more fibers 302 may pass through the sight housing 904 and be fixed to and/or wrapped around an exterior surface of the sight housing 904, such that natural light (e.g., sunlight) may enter one or more fibers 302 and illuminate the open end of the one or more fibers 302 pointed toward the shooter.

The sight housing 904 may include a fiber optic anchor 916 for the spirit level vial 306 of the anti-cant indication apparatus 300. For example, the open end of the one or more fibers 302 may be held in place proximate to the air pocket 308 of the spirit level vial 306, such that light (e.g., natural light from the sun) may be utilized by the anti-cant indication apparatus 300. When the bow scope 600 is leveled, the light (e.g., natural light from the sun) passes through the air pocket 308 in the spirit level vial 306 of the anti-cant indication apparatus 300 to transmit a light 918, where the light 918 is viewable by the shooter.

Figure 9A:
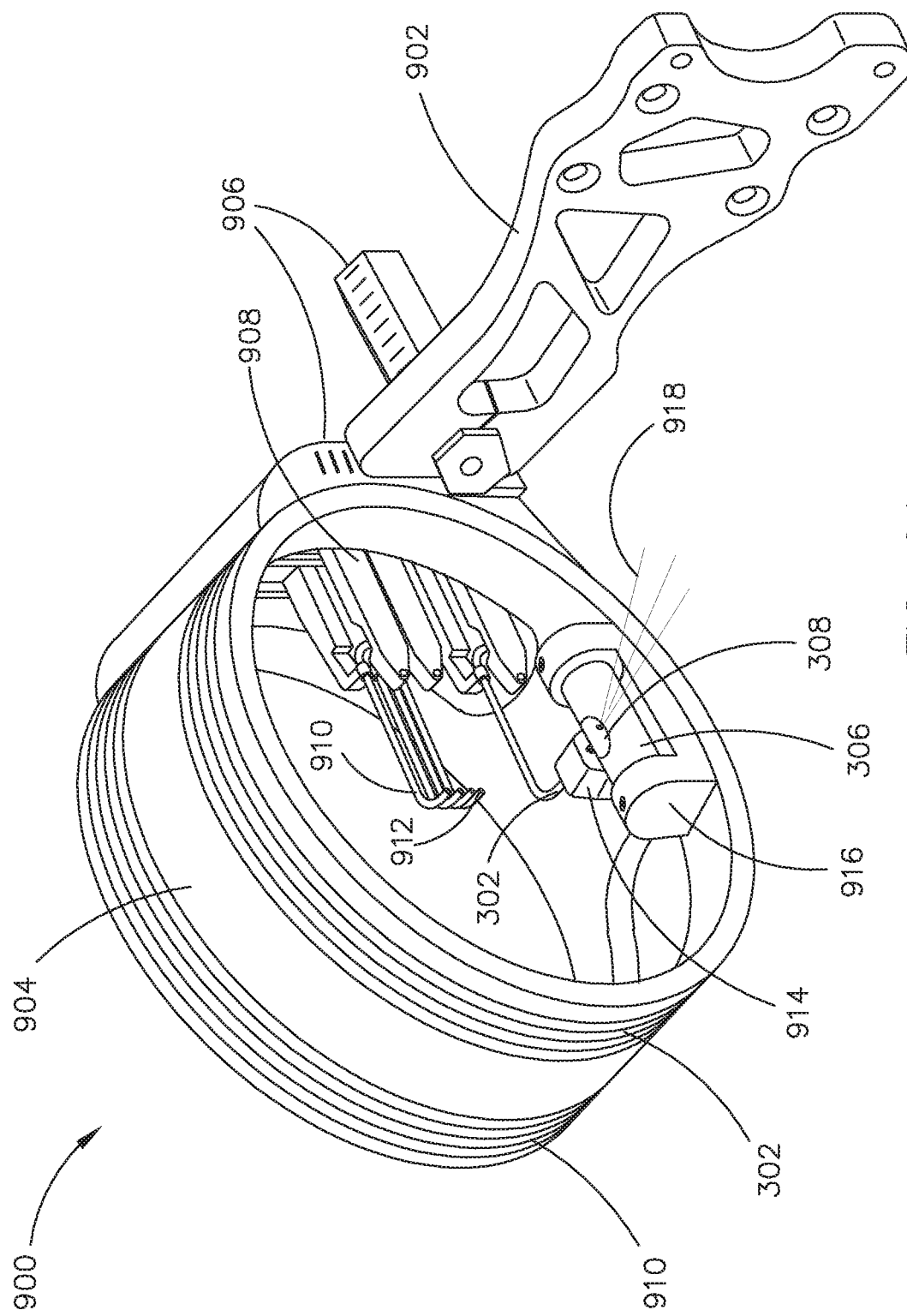
FIG. 9A illustrates a bow scope incorporated with the anti-cant indication apparatus, in accordance with one or more embodiments of the present disclosure.

Referring now to FIG. 9A, in one embodiment the one or more fibers 302 may be fixed in place by the one or more fiber optic brackets 908 (e.g., inside the sight housing 904). In this embodiment, the light 918 may be transmitted through the air pocket 308 of the spirit level vial 306 toward the shooter when the spirit level vial 306 is uncanted, the light 918 being generated from the natural light.

Figure 9B:
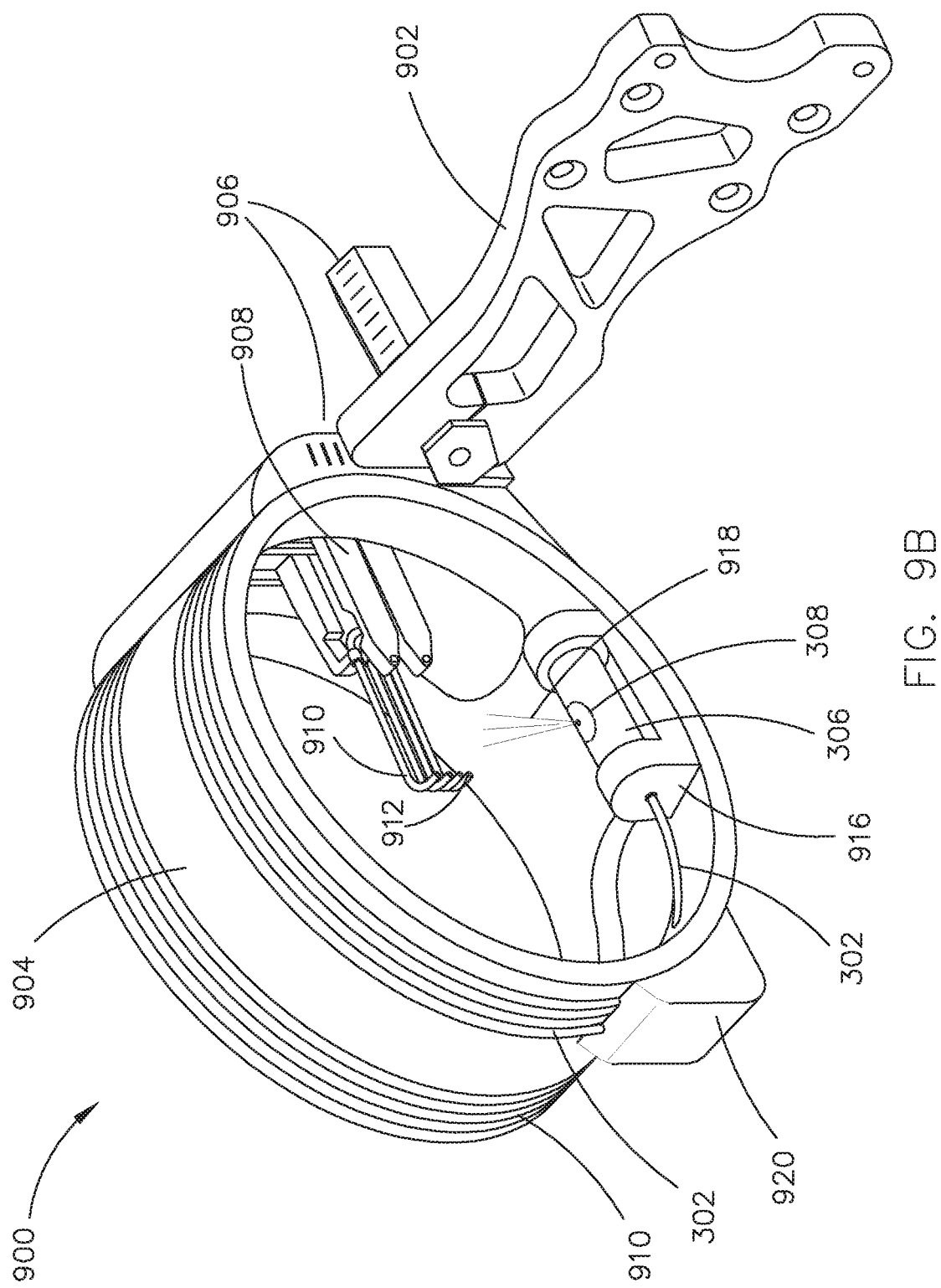
FIG. 9B illustrates a bow scope incorporated with the anti-cant indication apparatus, in accordance with one or more embodiments of the present disclosure.

Referring now to FIG. 9B, in one embodiment the one or more fibers 302 may pass through an end of the fiber optic anchor 916, such that light is transmitted through an end of the spirit level vial 306. For example, the one or more fibers 302 may pass through an optical channel (e.g., tube, bar, or the like) fabricated of a material with a transmittance and/or absorbance that does not inhibit light (e.g., as illustrated in FIGS. 15A-15D with spirit level vial 1104 and optical channel 1502). By way of another example, light may pass through one or more fibers (e.g., optical fibers) embedded within the spirit level vial 306, the one or more fibers being separate from the one or more fibers 302 (e.g., as illustrated in FIGS. 16A and 16B with spirit level vial 1104 and fiber 1602). The one or more fibers 302 may pass through the side of the sight housing 904 and be fixed in place by a fiber optic anchor 920. It is noted herein, however, that the one or more fibers 302 may be fixed in place by the sight housing 904, such that the fiber optic anchor 920 is not necessary. In this embodiment, the light 918 may be transmitted through the air pocket 308 of the spirit level vial 306 up and in front of the shooter when the spirit level vial 306 is uncanted, the light 918 being generated from the natural light.

Figure 9C:
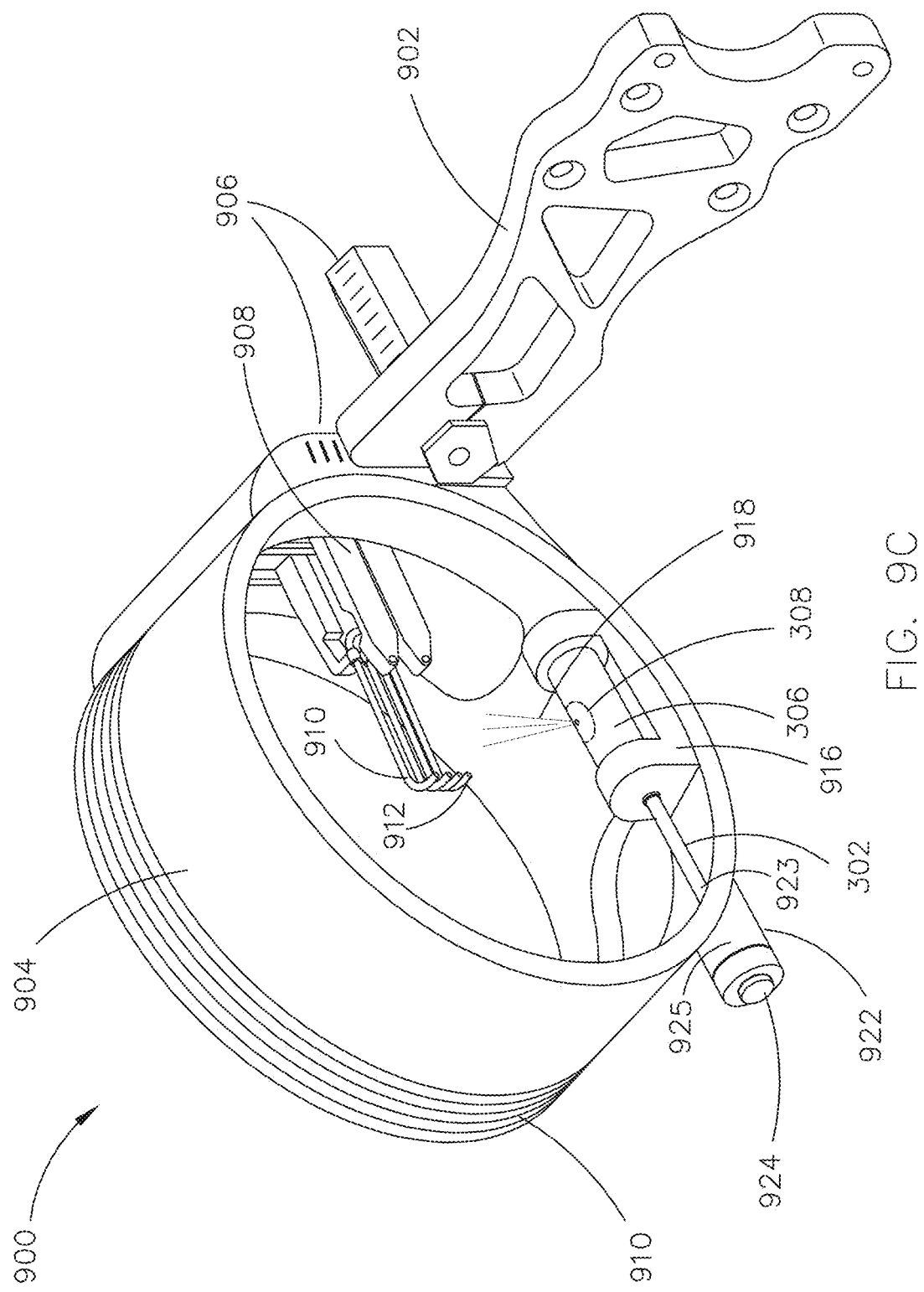
FIG. 9C illustrates a bow scope incorporated with the anti-cant indication apparatus, in accordance with one or more embodiments of the present disclosure.

Referring now to FIG. 9C, in one embodiment the one or more fibers 302 are coupled to an artificial light generator 922 configured to provide an artificial light. For example, the artificial light may be a light from electroluminescence including, but not limited to, a light-emitting-diode (LED). By way of another example, the artificial light may be caused by an electric discharge including, but not limited to, a lamp. It is noted that any artificial light which does not damage human eyes may be utilized in the present disclosure as the light source, such as, but not limited to, photoluminescence lights, electrochemiluminescence lights, chemiluminescence lights, bioluminescence lights, or the like. The artificial light generator 922 may include a light output device 923 (e.g., an LED, a lamp bulb, of the like). The artificial light generator 922 may include an operation switch 924 (e.g., a button switch, a toggle switch, or the like). For example, the operation switch 924 may turn on and/or off the artificial light generator 922, turn on and/or off a flash pattern of the artificial light generator 922, or the like. The artificial light generator 922 may include a battery compartment 925 configured to hold any number of coin-shaped or button-shaped cells, cylindrical-shaped cells, rectangular-shaped cells, or the like. It is noted herein, however, that the batteries may be housed in a compartment external to the artificial light generator 922. In addition, it is noted herein that the power source for the artificial light generator 922 may be wired. In this embodiment, the light 918 may be transmitted through the air pocket 308 of the spirit level vial 306 up and in front of the shooter when the spirit level vial 306 is uncanted, the light 918 being generated from the artificial light.

Figure 9D:
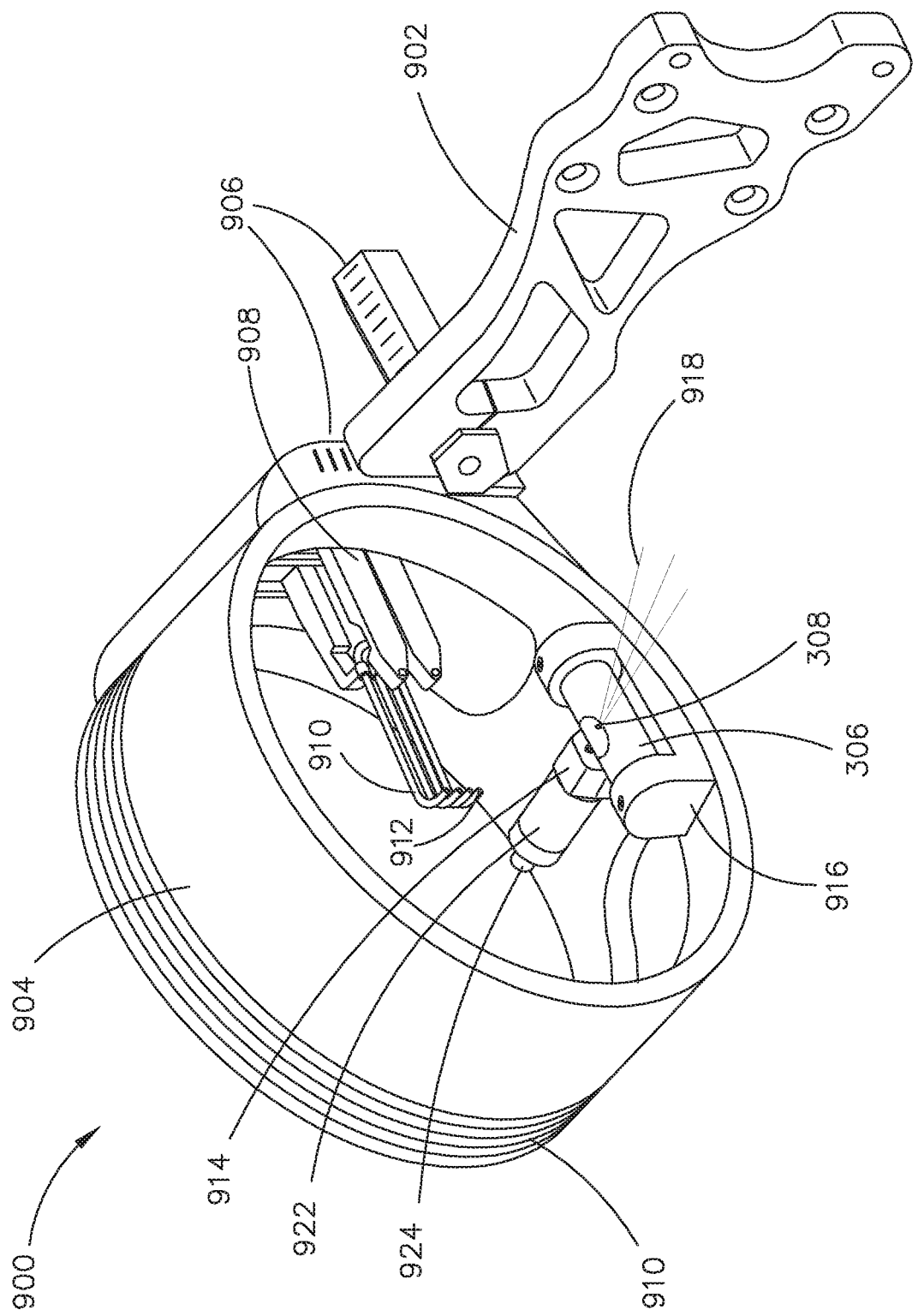
FIG. 9D illustrates a bow scope incorporated with the anti-cant indication apparatus, in accordance with one or more embodiments of the present disclosure.

Referring now to FIG. 9D, in one embodiment, the artificial light generator 922 is proximate to and/or coupled to the fiber optic anchor 914. For example, the artificial light produced may pass through one or more optical fibers within the fiber optic anchor 914 and be held proximate to the air pocket 308 of the spirit level vial 306. In this embodiment, the light 918 may be transmitted by the air pocket 308 of the spirit level vial 306 toward the shooter when the spirit level vial 306 is uncanted, the light 918 being generated from the artificial light.

The fiber optic anchor 914, the fiber optic anchor 916, and/or the fiber optic anchor 920 may be fixed on to the sight housing 904 by any attaching method known in the art, such as, but not limited to, a magnet, a clip, a screw, a bolt, a clamp, a VELCRO, a tie, or an adhesive (e.g., a glue, or the like).

Figure 10:
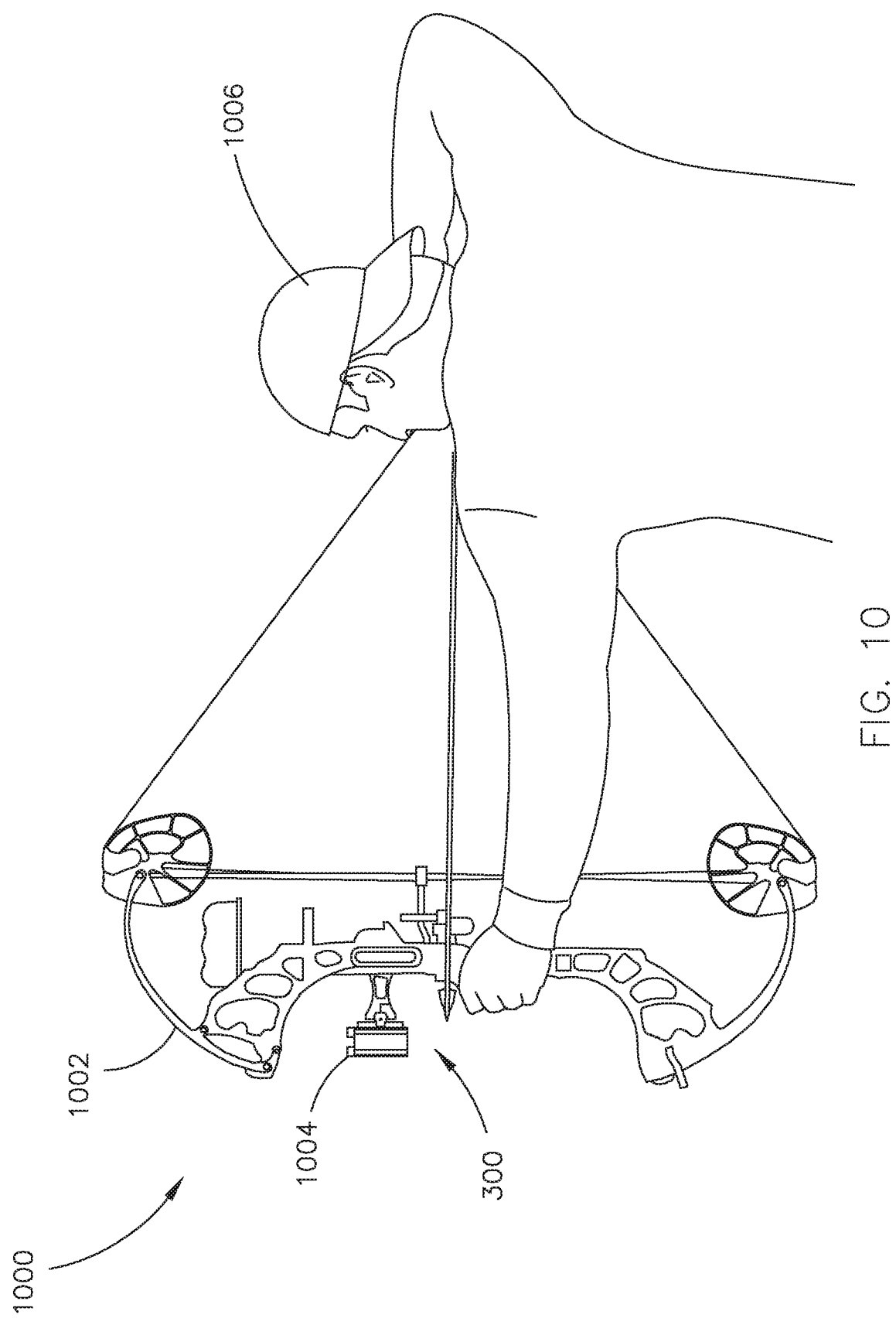
FIG. 10 illustrates a bow shooting position with a bow equipped with the anti-cant indication apparatus, in accordance with one or more embodiments of the present disclosure.

FIG. 10 illustrates a shooting position with a bow equipped with the anti-cant indication apparatus 300, in accordance with one or more embodiments of the present disclosure. It is noted herein that the embodiments and components described previously herein with respect to the apparatus 300 should be interpreted to extend to the embodiments described in FIG. 10.

In one embodiment, a bow shooting position 1000 may include a bow 1002. In some embodiments, the bow shooting position 1000 may include a bow scope 1004 mounted on the bow 1002. In some embodiments, the bow shooting position 1000 may include the anti-cant indication apparatus 300 installed on a surface of the bow 1002 (e.g., a surface of a riser). In some embodiments, the bow shooting position 1000 may include a shooter 1006 holding a bow assembly (e.g., the bow 1002 and the anti-cant indication apparatus 300 coupled to the bow 1002 and/or the bow scope 1004).

It is noted that the shooter looking at the bow 1002 and/or the bow scope 1004 is able to see the light shining from the anti-cant indication apparatus 300 with great ease when the bow 1002 experiences no canting. It is further noted that in order for the shooter to use the anti-cant indication apparatus 300 effectively, no special shooting position is required.

FIGS. 11A-11E illustrate a construction level (e.g., contractor's level or carpenter's level) incorporated with the anti-cant indication apparatus 300, in accordance with one or more embodiments of the present disclosure.

Figure 11C:
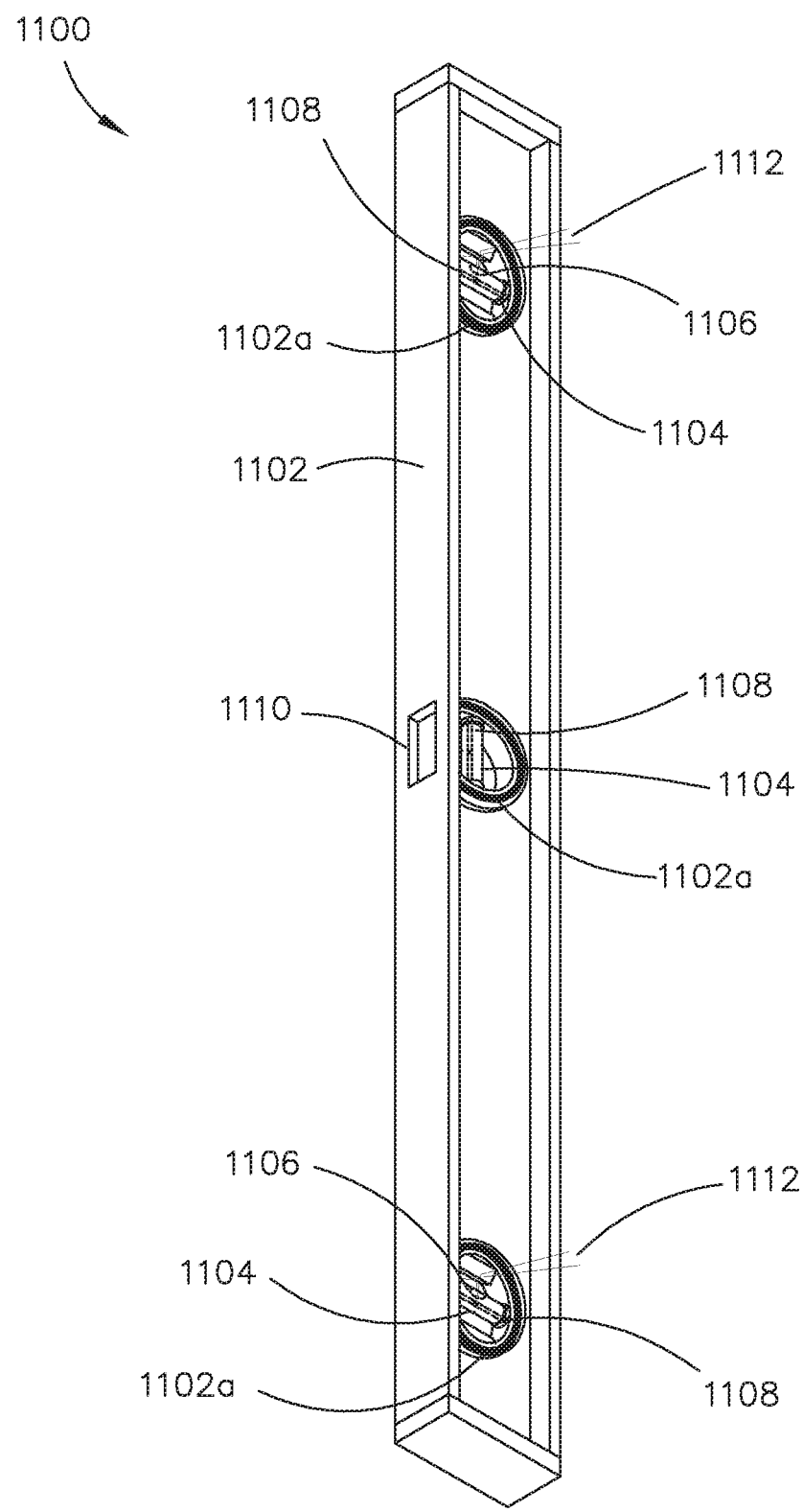
FIG. 11C illustrates the construction level incorporated with the anti-cant indication apparatus, in accordance with one or more embodiments of the present disclosure.

In one embodiment, a level 1100 includes a frame 1102 with one or more cutouts 1102a. A cutout 1102a may include a spirit level vial 1104 set at an angle ranging from 0 to 90 degrees relative to a long axis of the frame 1102. The spirit level vial 1104 may include an air pocket 1106 that travels along an optical channel (e.g., tube, bar, or the like) 1108. It is noted herein, however, that the air pocket 1106 may travel along an interior surface of the spirit level vial 1104 and/or along an exterior surface of the optical channel 1108. Referring now to FIGS. 11A, 11B, and 11D, a cutout 1102a may be proximate to a cut-out 1110 through which light 1112 transmitted through the air pocket 1106 when the level 1100 is uncanted. For example, a cutout 1102a with a spirit level vial 1104 set at an angle of 0 degrees of the long axis of the frame 1102 may be proximate to the cut-out 1110. Referring now to FIGS. 11C and 11E, the light 1112 may be transmitted outward from the frame 1102 when the level 1100 is uncanted.

Referring now to FIG. 11B, in some embodiments the light 1112 may be generated via the transmission of light collected via one or more fibers 1114 and/or one or more fibers 1118. For example, a fiber 1114 may include a light collecting end 1114a and a light transmitting end 1114b. By way of another example, a fiber 1118 may include a light collecting end 1118a and a light transmitting end 1118b.

The one or more fibers 1114, 1118 may collect and transmit natural light. For example, the natural light may be sunlight. By way of another example, the natural light may be moonlight. It is noted that the natural light may include any natural light known in the art capable of providing a light source.

The one or more fibers 1114, 1118 may collect and transmit artificial light. For instance, the artificial light may be a light from electroluminescence including, but not limited to, a light-emitting-diode (LED). In addition, the artificial light may be caused by an electric discharge including, but not limited to, a lamp. It is noted that any artificial light which does not damage human eyes may be utilized in the present disclosure as the light source, such as, but not limited to, photoluminescence lights, electrochemiluminescence lights, chemiluminescence lights, bioluminescence lights, or the like.

The artificial light may be provided by an artificial light generator 1116, where the light collecting ends 1114a, 1118a are proximate to and/or coupled to the artificial light generator 1116. For example, the artificial light may be a light from electroluminescence including, but not limited to, a light-emitting-diode (LED). By way of another example, the artificial light may be caused by an electric discharge including, but not limited to, a lamp. It is noted that any artificial light which does not damage human eyes may be utilized in the present disclosure as the light source, such as, but not limited to, photoluminescence lights, electrochemiluminescence lights, chemiluminescence lights, bioluminescence lights, or the like. The artificial light generator 1116 may include a light output device 1117 (e.g., an LED, a lamp bulb, of the like). The artificial light generator 1116 may include a switch 1119 (e.g., a button switch, a toggle switch, or the like). For example, the switch 1119 may turn on and/or off the artificial light generator 1116, turn on and/or off a flash pattern of the artificial light generator 1116, or the like. The artificial light generator 1116 may include a battery compartment 1121 configured to hold any number of coin-shaped or button-shaped cells, cylindrical-shaped cells, rectangular-shaped cells, or the like. It is noted herein, however, that the batteries may be housed in a compartment external to the artificial light generator 1116. In addition, it is noted herein that the power source for the artificial light generator 1116 may be wired.

Referring now to FIGS. 11D and 11E, in some embodiments a spirit level vial 1104 may be coupled to a cutout 1102a via one or more spirit level vial anchors 1120. The one or more spirit level vial anchors 1120 may allow access to and/or be coupled to the optical channel 1108 within the spirit level vial 1104.

FIGS. 15A-16B generally illustrate cross-section views of a spirit level vial of the anti-cant indication apparatus 300, in accordance with one or more embodiments of the present disclosure.

FIGS. 15A-15D generally illustrate the spirit level vial 1100 including the optical channel 1108 supported by one or more optical channel anchors 1500, in accordance with one or more embodiments of the present disclosure. The one or more optical channel anchors 1500 may be configured to include one or more optical fibers 1502, where an optical fiber 1502 includes a light transmitting end 1504. The one or more optical fibers 1502 may be proximate to and/or coupled to the one or more optical fibers 1114, 1118. It is noted herein, however, that the one or more optical channel anchors 1500 and the optical channel 1108 may be configured to receive the one or more optical fibers 1114, 1118, such that the one or more optical fibers 1502 are not necessary.

Figure 15A:
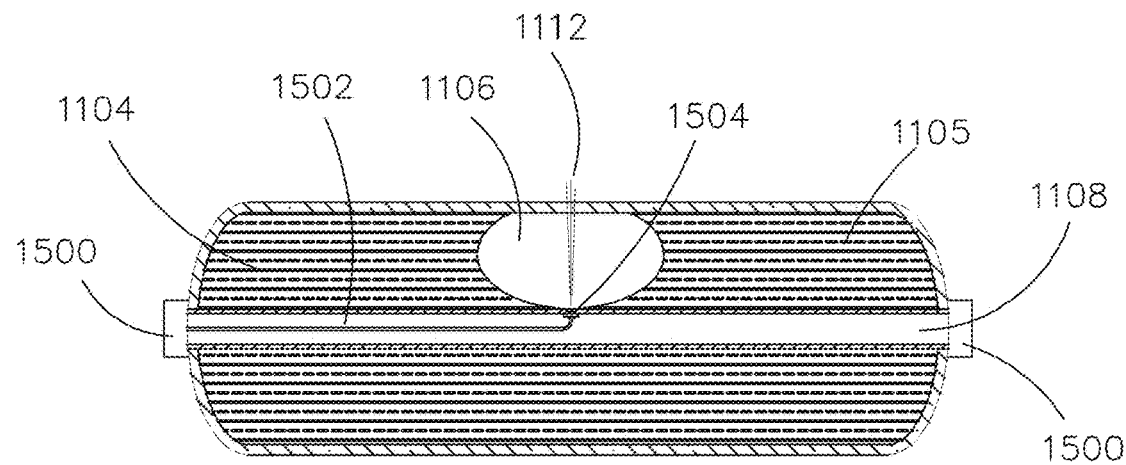
FIG. 15A illustrates a side cross-section view of a spirit level vial of the anti-cant indication apparatus without a canting error, in accordance with one or more embodiments of the present disclosure.
Figure 15B:
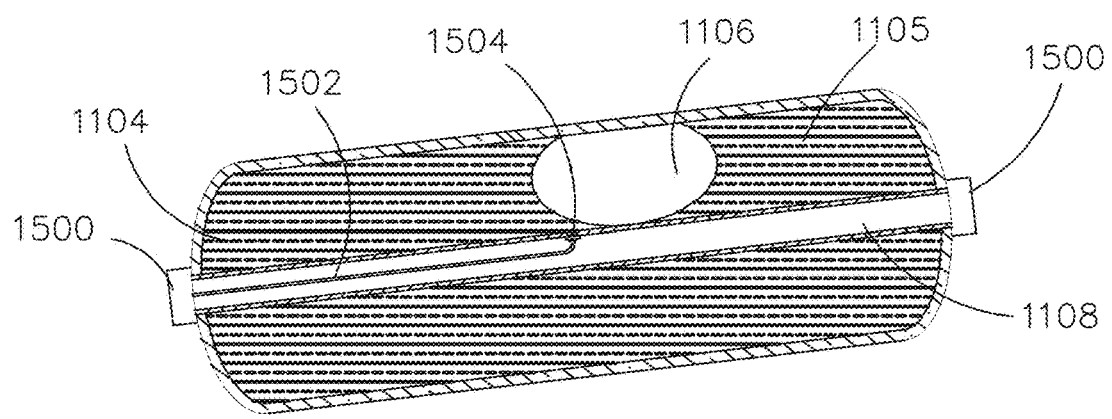
FIG. 15B illustrates a side cross-section view of a spirit level vial of the anti-cant indication apparatus with a canting error, in accordance with one or more embodiments of the present disclosure.
Figure 15C:
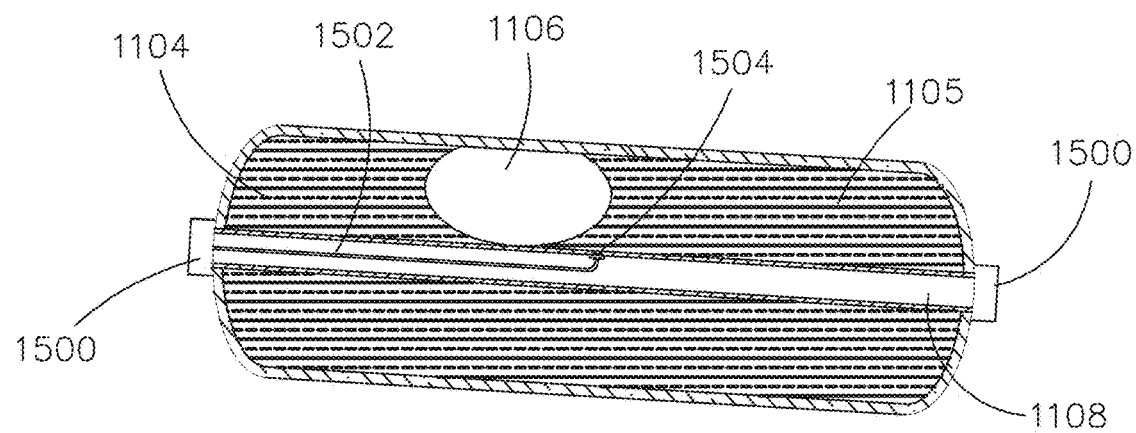
FIG. 15C illustrates a side cross-section view of a spirit level vial of the anti-cant indication apparatus with a canting error, in accordance with one or more embodiments of the present disclosure.
Figure 15D:
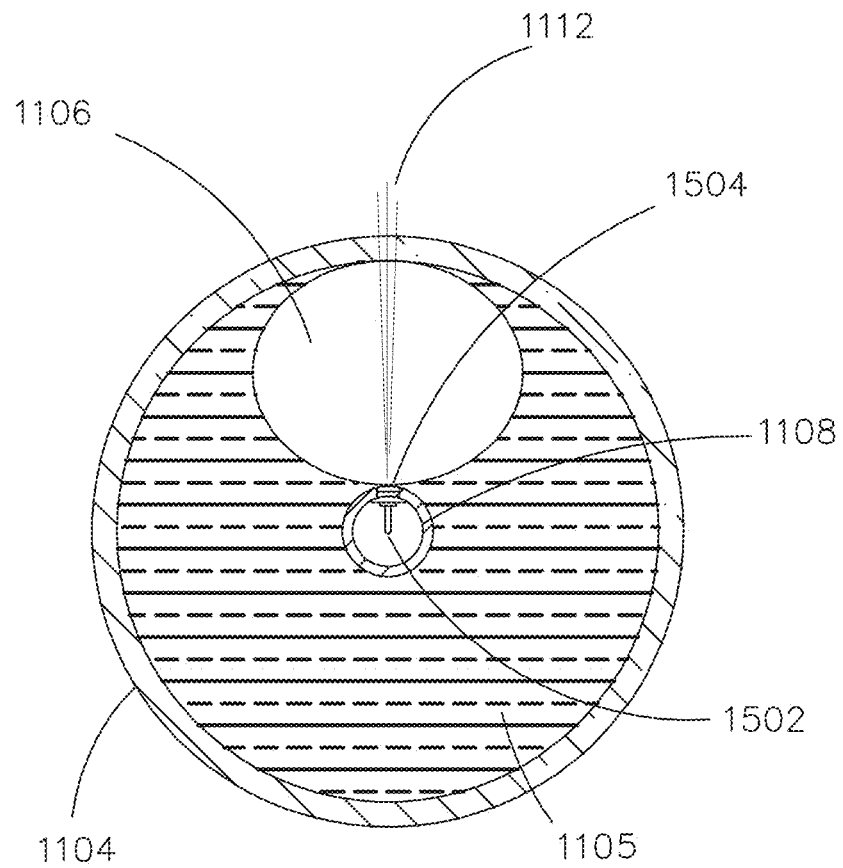
FIG. 15D illustrates an end cross-section view of the anti-cant indication apparatus without a canting error, in accordance with one or more embodiments of the present disclosure.
Figure 16A:
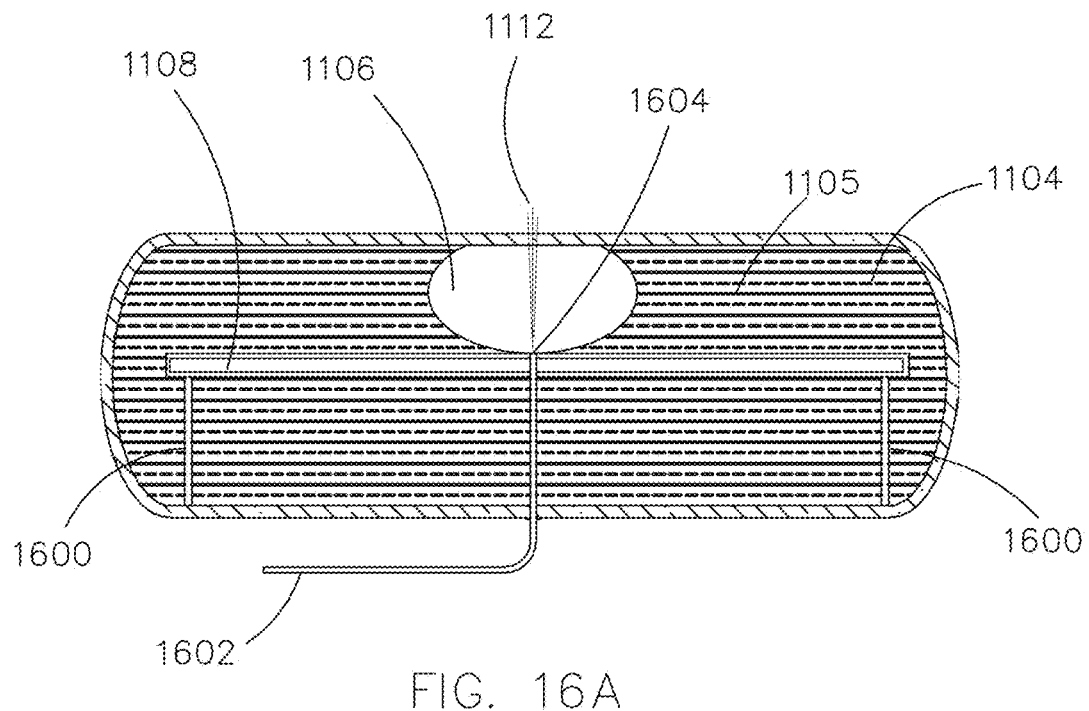
FIG. 16A illustrates a side cross-section view of a spirit level vial of the anti-cant indication apparatus without a canting error, in accordance with one or more embodiments of the present disclosure.
Figure 16B:
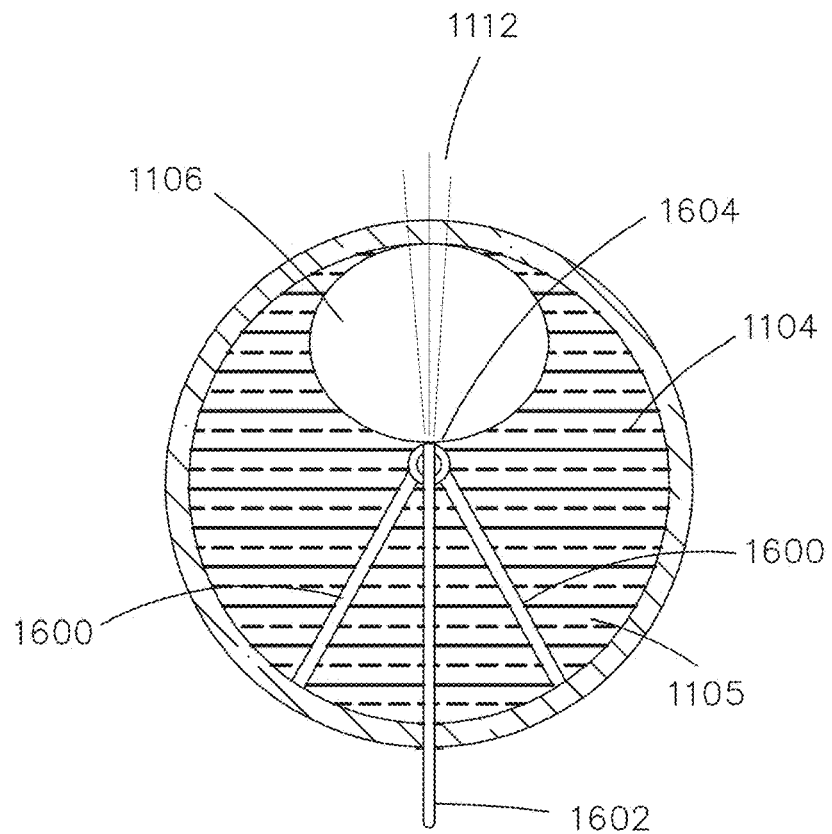
FIG. 16B illustrates an end cross-section view of the anti-cant indication apparatus without a canting error, in accordance with one or more embodiments of the present disclosure.

FIGS. 15A and 15D are illustrations depicting side and end cross-section views of the spirit level vial 1104 without a canting. In one embodiment, the spirit level vial 1104 may be leveled. For example, the air pocket 1106 of the spirit level vial 1104 may rest at the center of the spirit level vial 1104. By way of another example, the air pocket 1106 of the spirit level vial 1104 may be transparent. For instance, the air pocket 1106 of the spirit level vial 1104 may transmit light received from the one or more optical fibers 1502 via the light transmitting end 1504 as the light 1112. In this regard, a user gets an indication that the spirit level vial 1104 is leveled when a user sees the light 1112.

FIG. 15B is an illustration depicting a side cross-section view of the spirit level vial 1104 with a canting by tilting the projectile launcher to the left relative to the vertical axis of the earth. In one embodiment, the spirit level vial 1104 may not be leveled. For example, the spirit level vial 1104 may be canted. By way of another example, the canting may be indicated by the light 1112 not passing through the spirit level vial 1104. In FIG. 15B, the air pocket 1106 of the spirit level vial 1104 is depicted to rest in the right portion of the spirit level vial 1104. In this regard, the air pocket 1106 of the spirit level vial 1104 is not lined up with the light 1112 and the light 1112 is blocked by a dark-colored fluid 1105 of the spirit level vial 1104. In this regard, a user does not get an indication that the spirit level vial 1104 is leveled.

FIG. 15C is an illustration depicting a side elevation view of the spirit level vial 1104 with a canting by tilting the projectile launcher to the right relative to the vertical axis of the earth. In one embodiment, the spirit level vial 1104 may not be leveled. For example, the spirit level vial 1104 may be canted. By way of another example, the canting may be indicated by the light 1112 not passing through the spirit level vial 1104. In FIG. 15C, the air pocket 1106 of the spirit level vial 1104 is depicted to rest in the left portion of the spirit level vial 1104. In this regard, the air pocket 1106 of the spirit level vial 1104 is not lined up with the light 1112 and the light 1112 is blocked by the dark-colored fluid 1105 of the spirit level vial 1104. In this regard, a user does not get an indication that the spirit level vial 1104 is leveled.

FIGS. 16A and 16B generally illustrate the spirit level vial 1100 including the optical channel 1108 supported by one or more optical channel legs 1600, in accordance with one or more embodiments of the present disclosure. For example, the optical channel 1108 may be supported by one or more A-frame pattern of optical channel legs 1600. The spirit level vial 1100 may include one or more optical fibers 1602, where an optical fiber 1602 includes a light transmitting end 1604. For example, the one or more optical fibers 1602 may pass through a side wall of the spirit level vial 1100. The one or more optical fibers 1602 may be proximate to and/or coupled to the one or more optical fibers 1114, 1118. It is noted herein, however, that the one or more optical channel legs 1600 and the optical channel 1108 may be configured to include the one or more optical fibers 1602. In addition, it is noted herein that the spirit level vial 1104 and/or the one or more optical channel anchors 1600 and the optical channel 1108 may be configured to receive the one or more optical fibers 1114, 1118, such that the one or more optical fibers 1602 are not necessary.

FIGS. 16A and 16B are illustrations depicting side and end cross-section views of the spirit level vial 1104 without a canting. In one embodiment, the spirit level vial 1104 may be leveled. For example, the air pocket 1106 of the spirit level vial 1104 may rest at the center of the spirit level vial 1104. By way of another example, the air pocket 1106 of the spirit level vial 1104 may be transparent. For instance, the air pocket 1106 of the spirit level vial 1104 may transmit light received from the one or more optical fibers 1602 via the light transmitting end 1604 as the light 1112. In this regard, a user gets an indication that the spirit level vial 1104 is leveled when a user sees the light 1112.

It is noted herein that any embodiments directed to the spirit level vial 306 with air pocket 308 may be directed to the spirit level vial 1104 with air pocket 1106. In addition, is noted herein that any embodiments directed to the spirit level vial 1104 with air pocket 306 may be directed to the spirit level vial 306 with air pocket 308.

Advantages of the present disclosure include an anti-cant indication apparatus. Advantages of the present disclosure also include sending an indication to a user when the anti-cant indication apparatus is leveled. This is accomplished by a spirit level vial filled up with a first fluid so that when the spirit level vial is leveled the bubble lines up with the light source, which allows the light to pass through the spirit level vial and to be transferred to the user's eye. The vial of the present invention may be filled with any two fluids of disparate densities and light transmittance and/or absorbance (Beer-Lamber-Bouguer law) such that significant light (photons) will either pass or not pass when the spirit level is uncanted (level) or canted (unlevel).

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

Although particular embodiments of this invention have been illustrated, it is apparent that various modifications and embodiments of the invention may be made by those skilled in the art without departing from the scope and spirit of the foregoing disclosure. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Accordingly, the scope of the invention should be limited only by the claims appended hereto.

What is claimed:

1. A cant indication apparatus, comprising:
   a spirit level, comprising:
      a first fluid including at least one of a first light transmittance or absorbance; and
      a second fluid including at least one of a second light transmittance or absorbance, the second fluid forming a bubble in the first fluid, a position of the bubble configured to indicate at least an uncanted orientation and a canted orientation;
   a first optical fiber, comprising:
      a light collecting end configured to receive illumination from an illumination source; and
      a connecting end proximate to the spirit level, the bubble in the spirit level being nearest to the connecting end of the first optical fiber when the bubble of the spirit level is in the uncanted orientation; and
   a second optical fiber, comprising:
      a connecting end proximate to the spirit level and in substantial optical alignment with the connecting end of the first optical fiber, the bubble in the spirit level being nearest to the connecting end of the second optical fiber when the bubble of the spirit level is in the uncanted orientation; and
      an indicator end, illumination through the indicator end configured to indicate when the bubble of the spirit level is in the uncanted orientation.

2. The apparatus in claim 1, a diameter of the bubble in the spirit level being dependent on a diameter of one or more of the first optical fiber or the second optical fiber.

3. The apparatus in claim 2, the diameter of the bubble in the spirit level ranging between 50% and 150% of the diameter of the first optical fiber.

4. The apparatus in claim 2, the diameter of the bubble in the spirit level ranging between 50% and 150% of the diameter of the second optical fiber.

5. The apparatus in claim 2, one or more of the first optical fiber or the second optical fiber ranging between 0.003 and 0.25 inches in diameter.

6. The apparatus in claim 1, the spirit level fabricated from a non-opaque material.

7. The apparatus in claim 1, the illumination source being a natural light illumination source.

8. The apparatus in claim 1, the illumination source being an artificial light generator including at least one of a light-emitting-diode (LED) or a lamp.

9. The apparatus in claim 8, the artificial light generator including a light output device coupled to at least one of an operation switch or a battery compartment.

10. The apparatus in claim 1, the first fluid including a liquid, the second fluid including a gas.

11. The apparatus in claim 1, the first fluid including a first liquid, the second fluid including a second liquid.

12. The apparatus in claim 11, the first liquid being of a darker color than the second liquid.

13. The apparatus in claim 11, the first liquid being of a different density than the second liquid.

14. The apparatus in claim 1, the at least the uncanted orientation and the canted orientation indicated by the position of the bubble in the spirit level being orientation states of a device coupled to the spirit level, the first optical fiber, and the second optical fiber.

15. The apparatus in claim 14, the device including at least one of a projectile launcher or a scope coupled to the projectile launcher.

16. The apparatus in claim 14, the device including at least one of a firearm or a scope coupled to the firearm.

17. The apparatus in claim 14, the device including at least one of a bow or a scope coupled to the bow.

18. The apparatus in claim 14, the device including a construction level.

19. A system, comprising:
a cant indication apparatus, comprising:
  a spirit level comprising:
    a first fluid including at least one of a first light transmittance or absorbance; and
    a second fluid including at least one of a second light transmittance or absorbance, the second fluid forming a bubble in the first fluid, a position of the bubble configured to indicate at least an uncanted orientation and a canted orientation;
  a first optical fiber, comprising:
    a light collecting end configured to receive illumination from an illumination source; and
    a connecting end proximate to the spirit level, the bubble in the spirit level being nearest to the connecting end of the first optical fiber when the bubble of the spirit level is in the uncanted orientation;
  a second optical fiber, comprising:
    a connecting end proximate to the spirit level and in substantial optical alignment with the connecting end of the first optical fiber, the bubble in the spirit level being nearest to the connecting end of the second optical fiber when the bubble of the spirit level is in the uncanted orientation; and
    an indicator end, illumination through the indicator end configured to indicate when the bubble of the spirit level is in the uncanted orientation; and
a projectile launcher coupled to the spirit level, the first optical fiber, and the second optical fiber of the cant indication apparatus,
the at least the uncanted orientation and the canted orientation indicated by the position of the bubble in the spirit level being orientation states of the projectile launcher.

20. A system, comprising:
a cant indication apparatus, comprising:
  a spirit level comprising:
    a first fluid including at least one of a first light transmittance or absorbance; and
    a second fluid including at least one of a second light transmittance or absorbance, the second fluid forming a bubble in the first fluid, a position of the bubble configured to indicate at least an uncanted orientation and a canted orientation;
  a first optical fiber, comprising:
    a light collecting end configured to receive illumination from an illumination source; and
    a connecting end proximate to the spirit level, the bubble in the spirit level being nearest to the connecting end of the first optical fiber when the bubble of the spirit level is in the uncanted orientation;
  a second optical fiber, comprising:
    a connecting end proximate to the spirit level and in substantial optical alignment with the connecting end of the first optical fiber, the bubble in the spirit level being nearest to the connecting end of the second optical fiber when the bubble of the spirit level is in the uncanted orientation; and
    an indicator end, illumination through the indicator end configured to indicate when the bubble of the spirit level is in the uncanted orientation; and
a construction level coupled to the spirit level, the first optical fiber, and the second optical fiber of the cant indication apparatus,
the at least the uncanted orientation and the canted orientation indicated by the position of the bubble in the spirit level being orientation states of the construction level.

* * * * *